United States Patent
Amaitis et al.

(10) Patent No.: US 11,931,656 B2
(45) Date of Patent: Mar. 19, 2024

(54) FANTASY GAMING

(71) Applicant: CFPH, LLC, New York, NY (US)

(72) Inventors: Lee Amaitis, Las Vegas, NV (US); Matthew Holt, Las Vegas, NV (US); Quinton Singleton, Las Vegas, NV (US); Ian Epstein, Henderson, NV (US)

(73) Assignee: CFPH, LLC, New York, NY (US)

( * ) Notice: Subject to any disclaimer, the term of this patent is extended or adjusted under 35 U.S.C. 154(b) by 274 days.

(21) Appl. No.: 16/905,371

(22) Filed: Jun. 18, 2020

(65) Prior Publication Data

US 2020/0316480 A1 Oct. 8, 2020

Related U.S. Application Data

(63) Continuation of application No. 13/788,412, filed on Mar. 7, 2013, now abandoned.

(51) Int. Cl.
A63F 13/00 (2014.01)
A63F 13/795 (2014.01)

(52) U.S. Cl.
CPC ................... *A63F 13/795* (2014.09)

(58) Field of Classification Search
CPC ..................................... A63F 13/795
See application file for complete search history.

(56) References Cited

U.S. PATENT DOCUMENTS

| | | | |
|---|---|---|---|
| 7,351,149 B1 | 4/2008 | Burton et al. | |
| 7,614,944 B1 | 11/2009 | Hughes | |
| 8,308,569 B2 | 11/2012 | Amaitis et al. | |
| 2006/0111170 A1 | 5/2006 | Hornik et al. | |
| 2007/0145149 A1* | 6/2007 | Carnevali | G06F 1/163 |
| | | | 235/462.44 |
| 2007/0191101 A1 | 8/2007 | Coliz et al. | |
| 2007/0191103 A1 | 8/2007 | Van Luchene | |
| 2007/0203591 A1 | 8/2007 | Bowerman | |
| 2008/0033734 A1 | 2/2008 | Carry | |
| 2008/0146302 A1 | 6/2008 | Olsen et al. | |
| 2008/0161113 A1 | 7/2008 | Hansen | |
| 2008/0287198 A1 | 11/2008 | Callery | |
| 2009/0023495 A1 | 1/2009 | Koustas | |
| 2009/0215527 A1 | 8/2009 | Lipscomb et al. | |
| 2010/0069148 A1 | 3/2010 | Cargill | |
| 2010/0184495 A1 | 7/2010 | Levy et al. | |
| 2010/0279764 A1 | 11/2010 | Allen | |
| 2011/0098093 A1 | 4/2011 | Amaitis et al. | |
| 2011/0276700 A1 | 11/2011 | Chaturvedi | |
| 2012/0079121 A1 | 3/2012 | Rapo | |

(Continued)

FOREIGN PATENT DOCUMENTS

| | | |
|---|---|---|
| JP | 2008-539960 | 11/2008 |
| TW | 201221191 | 6/2012 |

(Continued)

*Primary Examiner* — James S. McClellan
*Assistant Examiner* — Jeffrey K Wong

(57) ABSTRACT

Some embodiments include a fantasy sports game. In some embodiments, an expected performance value may be determined that may affect the outcomes of a fantasy game. In some embodiments, player location may affect available opponents for a game. Groups may play against one another in a fantasy competition. Various examples of fantasy gaming options are given.

20 Claims, 4 Drawing Sheets

(56) References Cited

U.S. PATENT DOCUMENTS

| | | |
|---|---|---|
| 2012/0142411 A1 | 6/2012 | Thompson |
| 2012/0202599 A1* | 8/2012 | Cohen .................. A63F 13/798 463/43 |
| 2012/0302332 A1 | 11/2012 | Buhr |
| 2014/0256445 A1 | 9/2014 | Amaitis et al. |
| 2018/0353861 A1 | 12/2018 | Amaitis et al. |
| 2020/0179811 A1 | 6/2020 | Lee et al. |

FOREIGN PATENT DOCUMENTS

| | | |
|---|---|---|
| TW | 201231133 | 8/2012 |
| TW | I620590 | 4/2018 |
| WO | WO 2006/122105 | 11/2006 |
| WO | WO 2008/101188 | 8/2008 |

* cited by examiner

FANTASY GAMING

CROSS REFERENCE TO RELATED APPLICATIONS

This application is a continuation of U.S. patent application Ser. No. 13/788,412 filed on Mar. 7, 2013.

FIELD

Some embodiments may relate to sport events, games based on actions of players in live sport events, other types of events, and/or other types of games.

BACKGROUND

Gaming may include risking an amount of money that one event will or will not happen. Fantasy sports may include one or more games related to events taking place in real sports games.

SUMMARY

Figure 1:
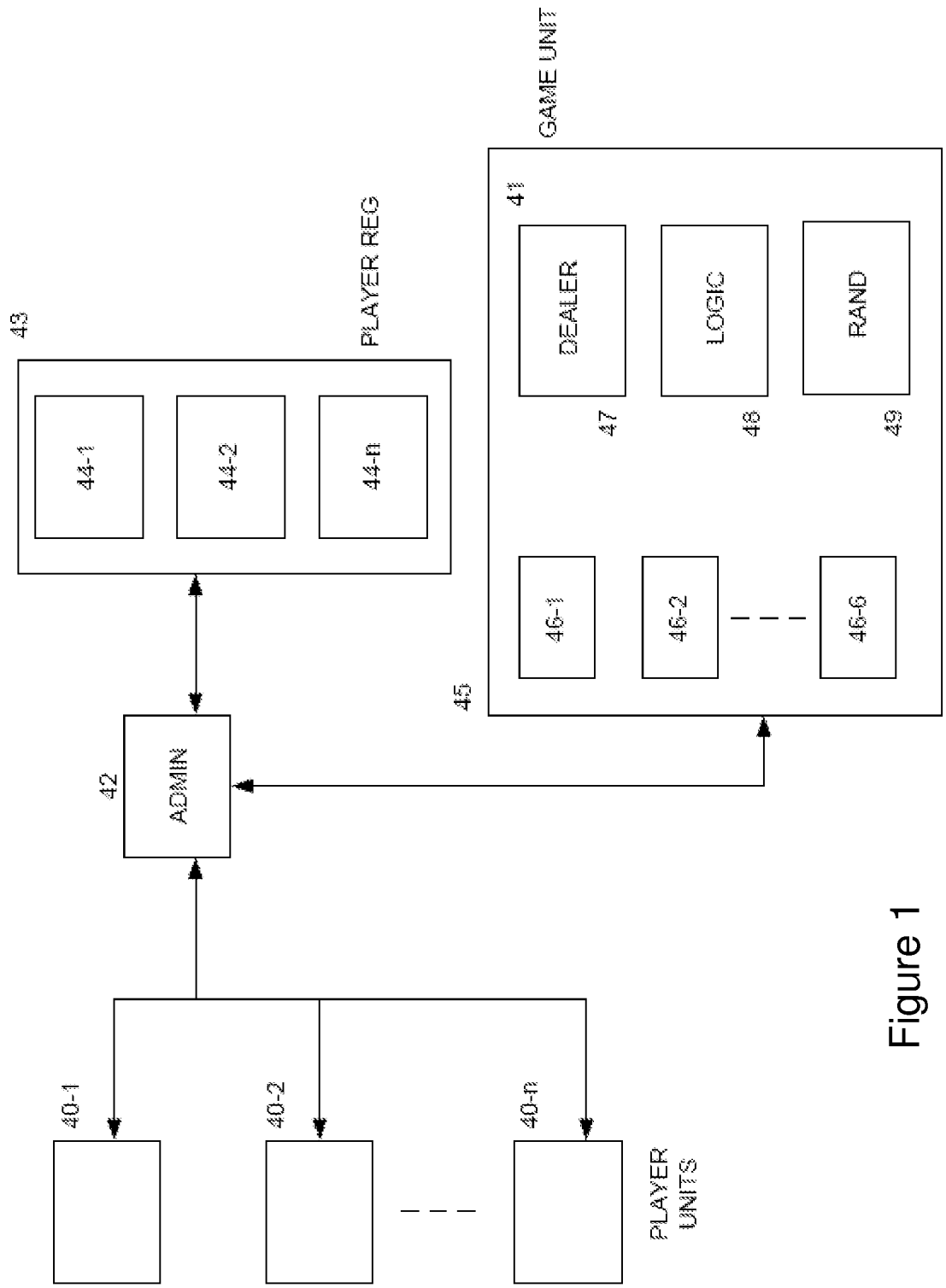
FIG. 1 shows an apparatus for playing a game, according to some embodiments.

The following should be understood to be embodiments, not claims.

A. A method comprising: determining, by a computing device, a first group of players to which a first player belongs; determining, by the computing device, a second group of players to which a second player belongs; determining, by the computing device, that the first player is allowed to play a game against the second player based on the first group and the second group being rival groups, in which the first player is not allowed to play games against other members of the first group; matching, by the computing device, the first player and the second playing the game; and determining, by the computing device, a winner of the game.

A.1. The method of claim A, comprising: determining that the first player belongs to the first group based on a location of the first player. A.2. The method of claim A, comprising: determining that the first player belongs to the first group based on a characteristic of the first player. A.2.1. The method of claim A.2, in which the characteristic includes to least one of: the first player being a fan of a first team, the first player being a student at a first school, the first player being an alumni of a first school, the first player being a patron of a first merchant, the first player living in a first location, and the first player being a first gender. A.3. The method of claim A, in which the game includes a fantasy sports game. A.4. The method of claim A, comprising: requiring the first player to pick at least one members of a first fantasy sports team for the game from a first set of players that is specific to the first group and the second player to select one member of a second fantasy sports team for the game from a second set of players that is specific to the second group. A.5. The method of claim A, in which determining the first group includes assigning the first player to the first group without a request from the first player to be assigned to the first group. A.6. The method of claim A, comprising: forming the first group, in which the first group is defined to include players that have a particular first characteristic. A.6.1. The method of claim A.6, in which forming the first group includes forming the first group in response to a request to form the group defined by the first characteristic from a sponsor of the first group.

A.7. The method of claim A, comprising: determining outcomes of a plurality of other games that are each between respective members of the first group and respective members of the second group. A.7.1. The method of claim A.7, comprising: determining an outcome of a group game based on the out outcome of the game and plurality of other games. A.7.1.1. The method of claim A.7.1, in which the first group wins the group game if a total number of games of the first game and the plurality of other games won by members of the first group exceeds a total number of games of the first game and the second game won by members of the second group. A.7.1.2. The method of claim A.7.1, in which a group that wins the group game is based on a total number of points earned by players in the first group through the first game and the plurality of other games compared to a total number of points earned by players in the second group though the first game and the plurality of other games. A.7.1.3. The method of claim A.7.1, comprising: assigning a prize to a group that wins the group game. A.7.1.3.1. The method of claim A.7.1.3, in which assigning the prize includes making a payment to respective accounts of players in the group that wins the group game. A.7.1.3.2. The method of claim A.7.1.3, in which assigning the prize includes making a payment to an account of a sponsor of the group that wins the group game. A.7.1.3.2.1. The method of claim A.7.1.3.2, in which the sponsor is not a player in the group that wins the group game. A.7.1.3.2.2. The method of claim A.7.1.3.2, in which the sponsor includes a charity chosen by the players in the group that wins the group game.

A.8. The method of claim A, in which the game includes a fantasy game that is based on a real life tournament, in which players in the tournament are dropped from the tournament as the tournament progresses and are not replaced in the fantasy game that is based on the tournament so that some members of each fantasy team in the game do not earn points after elimination from the tournament. A.9. The method of claim A, comprising: during play of first game, facilitating the first player offering a buyout of the game to the second player. A.9.1. The method of claim A.9, comprising: receiving, from the first player, an indication of an amount of money that the second player will be awarded if the second player accepts the buyout; and presenting that amount to the second player in an offer to end the game. A.9.1.1. The method of claim A.9.1, comprising: receiving an acceptance of the offer; and in response to receiving the acceptance, awarding the amount of money to the second player and awarding a second amount of money to the first player, in which the second amount of money includes an amount of money in a prize pool for the game minus the amount of money. A.10. The method of claim A, comprising: presenting the first player with an option to offer a doubling raise of the game to the second player prior to a start of the game. A.11. The method of claim A, comprising: receiving from at least one of the first player and the second player a selection of a statistic related to a real event that is to be used to score the game. A.12. The method of claim A, in which the first player access the game through a gaming operator that determines outcomes for the game and the second player access the game through a service provider that provides at least one of a white-labeled access to the game and an over the counter access to the game.

B. An apparatus comprising: a computing device; and a non-transitory medium having stored thereon a plurality of instructions that when executed by the computing device cause the apparatus to: determine a first group of players to which a first player belongs; determine a second group of players to which a second player belongs; determine that the first player is allowed to play a game against the second player based on the first group and the second group being rival groups, in which the first player is not allowed to play games against other members of the first group; match the first player and the second playing the game; and determine a winner of the game.

Any of the above example embodiments may be combined in any manner.

DETAILED DESCRIPTION

I. Example Embodiments

Colloquially, gaming may be referred to as wagering but it should be understood that embodiments are not limited to the statutory definition of wagering that is limited to games of chance but rather may include games of skill, fantasy games, games of chance, and/or any other type of games, and therefore the term gaming may be used when discussing some embodiments rather than the term wagering. Gaming may include a risk of an amount of money that some event will happen. Such risk may be skill and/or risk based, booked and/or pari-mutuel, and/or take any form desired. Gaming may include paying a fee to enter into a contest that is based on the occurrence of an event. The winner of such a contest may be provided with an award (e.g., money based on a sum of contest entry fees). Wagering may be used herein to refer to such skill or risk based gaming in some instances and should not be understood to be limited to one or the other type of gaming unless specified otherwise. Gaming may include wagering, betting, risking money, paying an entry fee to a contest, and/or any other form of gaming as desired. Various embodiments may apply to any type of gaming in any combination and/or arrangement.

Fantasy Game Examples

In some embodiments, a gaming operator may facilitate game play between multiple players. In some embodiments, a game may be a fantasy game. It should be recognized that embodiments are not limited to fantasy games but that examples are given in terms of a fantasy game in a non-limiting manner. Moreover, embodiments may include any fantasy or non-fantasy game or event on which a wager is placed as desired. U.S. patent applications 61/479,539, 12/605,826, 13/160,746 and 61/668,245 are hereby incorporated herein by reference. Some example fantasy games and/or wagers that may be used in some embodiments are described in these references. Further examples of fantasy games are described herein. These examples are given as non-limiting examples only. Various features discussed may be combined with any fantasy game in any manner or combination.

Various examples are given in relation to a popular variation of fantasy events, namely fantasy sports, but it should be understood that various embodiments may include any fantasy event. In some embodiments, fantasy sports may provide a manner for a participant to act in a role similar to a coach and/or general manager. In some embodiments, a participant may be given the ability to draft, create, trade, dismiss and/or otherwise manage a fantasy team.

The events, participants, and/or members of teams to which a fantasy event may be related may include any desired events, participants, and/or members of teams. For example, some events may include political events (e.g., elections), sporting events (e.g., football, baseball, basketball, hockey, soccer, rugby, golf, tennis, automotive racing, animal racing), competitions (poker, test taking, rock throwing, tree growing), other events, and so on. For example, some participants and/or members of teams may include politicians, human players, animal participants, robots, natural phenomena, plants, physical things, and so on. It should be recognized that fantasy event competitions may be constructed based on any kind of activity. For example, fantasy competitions may be constructed based on an activity in which participants in the fantasy competition may compete vicariously based upon observations or statistics regarding some underlying activity (e.g., wind speed, elections, tree growth, baseball, and so on).

A fantasy team for an activity may include one or more members that each correspond to one or more respective real and/or active participants in the activity. For example, a fantasy team for a sport may include one or more players of the sport. The players may include active players in a real league for the sport. The players may include active league players from one or more real sports league.

In some embodiments, a member of a team may include a portion of a real team. For example, in some embodiments, in addition to and/or as an alternative to a particular member of a team being selected for a fantasy team, a portion of a team may be selected for a fantasy team. For example, a defensive team of a football team may be selected for a fantasy team regardless of actual members of the defensive team. Accordingly, scoring of such a fantasy team may relate to actions and/or performance of the entire defensive team rather than a single member of the team.

In some embodiments, a member of a fantasy team may include something related to a real life team that is not a actual player on a real life team. For example, in some embodiments, the fans of a team may be part of a fantasy team, a head coach of a real life team may be part of a fantasy team, and/or any other non-player that is related to a real life team may be part of a fantasy team. A gaming operator may use actions and/or statistics related to such non-player members to score a fantasy team involving such non-player members. For example, a fans may be given points based on attendance, noise generated, and/or any other measurable characteristic. A head coach may be given points based on use of timeouts, novelty and/or number of different plays, and so on. It should be recognized that any non-player may be used and any types of information may be used to determine a score earned by such a non-player. A gaming operator may receive such information and convert the information to a score that it assigns to a fantasy team.

In some embodiments, a participant in a fantasy sports game may select members to form a fantasy team for a sport. In some embodiments, a participant may select or "draft", currently active real-life players to form a fantasy team. Accordingly, a fantasy team for a sport may include a plurality of members that each correspond to a respective player of the sport. In some embodiments, a selected member for a fantasy team may include a group of players (e.g., the defense of a particular football team may be a member of a fantasy team, the outfield of a particular baseball team may be a member of a fantasy team, and so on) and/or non-players (e.g., fans, head coach).

In some embodiments a plurality of participants may form a fantasy league and select players in the fantasy league. Each player in the league may pay a fee to join the league. The fee may be pooled by a gaming operator for use in award payment, booked by the gaming operator as a wager, and/or paid to the gaming operator as a fee. The fantasy league may be referred to as a fantasy game, and the winning participant in the league may receive some award (e.g., from the gaming operator, from pooled funds held by the gaming operator, based on a fee paid to join the league, etc.). As an example, in a fantasy football league, a plurality of league participants (e.g., two) may each select one or more professional football players (e.g., 5) onto their fantasy team and pay a fee to be part of the league (e.g., $10). Based on performance of those selected players in real sports events, the participants may earn points in the fantasy sports league and a winner may be determined and paid an award (e.g., $20 minus some rake taken by the gaming operator).

It should be recognized that the form of risk and/or relationship between and/or among the parties to such a game and/or a gaming operator may take any form. Terms such as form a game are used in a broad sense to refer to any such form. For example, a wager may be established directly between two participants, a contractual obligation may be established between a gaming operator and each of the participants separately, a pari-mutuel pool may be established into which money may be placed, a book of bets may be formed into which money may be placed, and/or any desired method of forming a game may be used. In some embodiments, to form a game, each participant in a game may pay a contest entry fee to enter the contest. Such fees may be pooled together and used to pay a winner. A data structure may record information regarding formed games, and/or other information about gamers and/or games.

In some embodiments, a central authority (e.g., a gaming operator) may establish and/or enforce rules for a fantasy sports game. Such a central authority may include a casino, a server, a house, a book maker, a web site, and/or any other desired gaming operator. Such a central authority may be referred to as a commissioner, and/or a treasurer. In some embodiments, multiple entities may operate as separate parts of such a central authority (e.g., one treasurer and one commissioner). In some embodiments, the central authority may be configured to determine outcomes of a game, accept wagers, adjust balances, accept money, determine if a game condition is satisfy, establish leagues, maintain accounts, pay winnings, perform a method to facilitate functionality described herein, and so on. A central authority may include one or more computing devices (e.g., servers, processors, mobile devices, and so on) configured to perform one or more actions in order to facilitate gaming.

One example of a game that may be used in some embodiments may include a Cantor 5 (or Cantor any number) game that may be offered by Cantor Gaming and/or Cantor Data Services. In such a game, a league may be opened (e.g., by player and/or operator). Some non-limiting examples are given in terms of a 2 person league, but a league may be any number of users (e.g., 2, 5, 10, etc.). When a league is full (e.g., players equal to the maximum number have joined), the league may be closed and a game may be formed between/among the players that joined the league. So, for example, a user may desire to play a $50 dollar Cantor 5 game and so may form a two person Cantor 5 league with a $50 buy-in (e.g., risked amount, contest entry fee) by entering information through a website. A second user may see the formed league through the website and may join the league. At that point, the players may be entered into a $50 game with one another. Cantor may take a cut of the buy-ins for offering the fantasy service and may use the rest of the buy-ins to pay an award to a winner of the game. Cantor may pool the buy-ins into a pool that may be used to provide a winner some award.

At some point before a start of a game and/or some other closing trigger, each player may be required to select members for their fantasy team. Members may be chosen in any manner (e.g., round robin, individually, and so on). In some embodiments, each player may independently choose a team so that a team of one player does not affect to team of another player and that each player may have some or all same players on their team. A gaming operator (e.g., Cantor) may set an expected point total for each team (e.g. based on historical performance of each player on the team). To set such an expected point total Cantor may intentionally skew the number lower to encourage players to choose higher performing players. Based on the assigned expected value of each team, a spread may be created between the team. For example, if team A is expected to earn 95 points and team B is expected to earn 97 points, then a 2 point spread between the teams may be formed. A winner may be determined for the game based on the play of real games so that if Team B, for example, wins by more than two points, team B is the winning team because it beat the spread.

In some embodiments, a system may be configured to provide one or more participants with fantasy sports contest-related information. Fantasy sports contest-related information may include any suitable information associated with one or more fantasy sports contests. For example, fantasy sports contest-related information may include information regarding a participant's one or more rosters, a participant's standing in one or more fantasy sports contests, point tallies associated with a participant in one or more fantasy sports contests, information regarding the number of trades that a participant may make, information regarding the amount of fantasy money available to a participant for contracting players for a roster, information regarding deadlines to make trades or to perform any other suitable task associated with one or more fantasy sports contests, an outcome of a fantasy game and/or any other suitable information.

In some embodiments, a system may be configured to provide one or more participants with information regarding one or more real life games. Such information may include information regarding real-life athletes (e.g., names, statistics, etc.), real-life sports leagues (e.g., game schedules, standings, etc.), real-life sporting events (e.g., baseball games, golf tournaments, tennis matches, etc.), sports arenas, weather information, sports commentary, or any other suitable information regarding real-life sports or events.

In some embodiments, various types of fantasy games may be played. For example, a head-to-head type game may be played in some embodiments. A head-to-head game may include a participant competing against one or more participant (e.g., another player, a casino or other gaming operator) in a game (e.g., over a week, over a season and so on). In some embodiments, the fantasy team that accumulates the most points in the game period based on performance in actual games may win the game. As another example, a "rotisserie league" game may be played in some embodiments. In such a game, participants associated with respective fantasy teams compile won-lost records by competing head to head against each of the other teams in the league. A winner in such a system may be determined based on the performance of active real life athletes in real life games. It should be recognized that any desired game type and/or scoring system may be used in various embodiments.

In some embodiments, a playoff type game may be played. For example, participants may play one or more games during a regular season of fantasy games that may or may not correspond to a regular season of an underlying sport. Participants may be eliminated during the regular season in some embodiments. Participants may acquire points and/or wins during the regular season. Participants remaining at some point in the game, with a most number of points and/or wins at some point in the game may qualify for a playoff type game. The playoff game may be similar and/or different to a "regular season" game. For example, a participant may be able to select members for their playoff team and engage in games in the playoffs with the selected fantasy team. A winning of the playoff may be larger than a winning of a regular season. Players that may be selected may be limited to those players that are participating in a playoff in an underlying game. Different rules regarding budgets, uniqueness, and/or scoring may be used in a playoff game.

One or more games may include a user-specified accomplishment. For example, a group (e.g., head to head, pool, rotisserie, league, etc.) of players may play a group game. Each player may identify an accomplishment and a team. The team may win if the team achieves the accomplishment. Each player with a winning team may be a winning player in the game. A gaming operator may set some characteristic that determines how the money is split based on difficulty of achieving the accomplishment (e.g., players with more difficult accomplishments may gain more money from a pool). A single player game may be played in which similarly an odds or other characteristic may be determined by a house that facilitates play of the game.

Some embodiments may include a pari-mutuel pool for a league. For example, each player that enters a team into a league may pay money. The winner of the league may win at least a portion of the pool of money.

It should be recognized that a fantasy sports game need not be limited or restricted in time. For example, a fantasy sports contest may last an entire season, a portion of the season, a definite period of time (e.g., one month, two weeks, three days, one hour, etc.), the duration of a particular event (e.g., Wimbledon, etc.), a portion of a particular event, or any other suitable period of time.

In some embodiments, a fantasy sports contests may include event game options. For example, fantasy sports contests may involve a participant wagering on whether particular outcomes will occur (e.g., whether a particular golfer will make the next put). Such games may be played against a house, another participant (e.g., a participant against whom a team to team game is played, and so on).

It should be recognized that these examples are only one non-limiting examples and that any manner of fantasy gaming and/or or other gaming/wagering may be used as desired.

Example Interface Discussion

Some embodiments may include presenting an interface through which a player may form a team for such a game and/or receive/enter any information about such a game. Such an interface may identify if one or more possible members has been chosen as part of a casino team and/or other team (e.g, that may eliminate the selection by a player for a game against that particular team in some embodiments). Such members may be excluded from an interface in some embodiments if rules of such an embodiment prevent the member form being added to a team for some reason (e.g., the member is in another team, there are already a number of common members to teams and addition of a member would exceed a maximum threshold of common members, a member is expected to be injured, and so on). Such an interface may identify a number of times a member has been selected for a team and/or an amount of money that has been risked on and/or against teams with a member. Information for such an interface may be populated by a gaming operator and presented to a user through a computing device (e.g., a cellular telephone, a kiosk, etc.)

In some embodiments, one or more characteristics for a game involving a player's team, a casino's team and/or any number of other teams may be determined based on members of each respective team and/or an accomplishment selected by a player. For example, in some embodiments, odds, moneylines, point spreads, a handicap and/or any desired characteristic may be determined for a game of one team against another team based on expected performance of members of one team compared to members of another team. Various examples of determining characteristics are given herein.

In some embodiments, such information may be displayed in an interface related to a selection of a team. For example, a handicap or other information (such as odds, payout ratios, etc.) may be displayed in an interface for the selection of a team. Such information may identify how a selection of one player or another player has affected or would affect a handicap if added to a team. For example, a handicap may identify a current handicap at a current makeup of a team even if the team is not complete or finalized. As members are added and/or change, the handicap may adjust to reflect the next state of the team.

In some embodiments, in response to a selection of a player's team and/or an opponent's team, such characteristics may be displayed to a player though an interface. For example, in response to a formation of a player's team and a selection by that player that the player desires to enter into a game setting that team against an accomplishment being achieved by the team, an indication of an odds (or other characteristic) for such a game may be identified through an interface to the player. The interface may allow the payer to accept, alter, set a money amount, reject, and so on the game having the identified characteristic. For example, an interface may identify that a player may enter into the game with the player's team being required to earn 8.5 points in order to win the game with a 3 to 1 odds. A player may be able to choose between achieving the accomplishment or not achieving the accomplishment with same or different odds. The player may enter a dollar amount in response to such an indication to play a game, press an accept button to enter into the game, reject entry into the game, and/or take any other actions through such an interface.

A user may choose members of a team, view odds, choose a side to game on, confirm a game, and so on through such an interface. A user may select a player team. A handicap of points may be determined (e.g., the player team has a 1 point advantage), and/or a money line may be determined (e.g., $115 must be game to win $100). Some embodiments may include tournament elements, group elements, raising elements, surrender elements, and/or any other elements that may be described herein or elsewhere. An interface may display controls and/or information regarding such elements to facilitate play.

It should be recognized that while some embodiments may be described in terms of a game against a casino and/or a wager against a casino, that other embodiments may include a game against another player and/or a game involving a team formed by another player and/or casino (e.g., casino formed team, player-specified accomplishment). Elements of one embodiment may apply to another embodiment in any combination (e.g., an interface that includes information such as handicaps about possible opponent teams may be included in a plurality of embodiments).

Example Systems

One example fantasy sports system is described in U.S. Pat. No. 6,371,855 to Gavriloff, which is hereby incorporated herein by reference. Another example fantasy sports system is described in U.S. Pat. No. 7,001,279 to Barber, which is hereby incorporated herein by reference. Yet another example of a fantasy sports system is described in U.S. patent publication number 2008/0287198 to Callery, which is hereby incorporated herein by reference. An example of a fantasy sports system that may include additional interactive elements is described in U.S. Pat. No. 7,351,150 to Sanchez, which is hereby incorporated herein by reference. One variation of a fantasy sports game is given in U.S. patent publication 2005/0064937 to Ballman, which is hereby incorporated herein by reference. An example of a fantasy sports betting system that may provide additional advice to players is described in U.S. patent publication 2007/0060380 to McMonigle, which is hereby incorporated herein by reference. An example commissioner system for a fantasy sports system is described in U.S. patent publication number 2008/0200254 to Cayce, which is hereby incorporated herein by reference. An example system for managing assets and transactions related to a fantasy sports system is described in U.S. patent publication 2008/0215168 to Charchian, which is hereby incorporated herein by reference. An example of pari-mutuel wagering related to fantasy sports is described in U.S. patent publication number 2009/0023495 to Koustas, which is hereby incorporated herein by reference.

It should be understood that the above are merely illustrative elements of fantasy sports contests. Any other suitable arrangement or approach may be used. It will further be understood that the nature of the fantasy sports contests may vary depending on which activity or sport is involved or based on any other suitable criteria.

Figure 2:
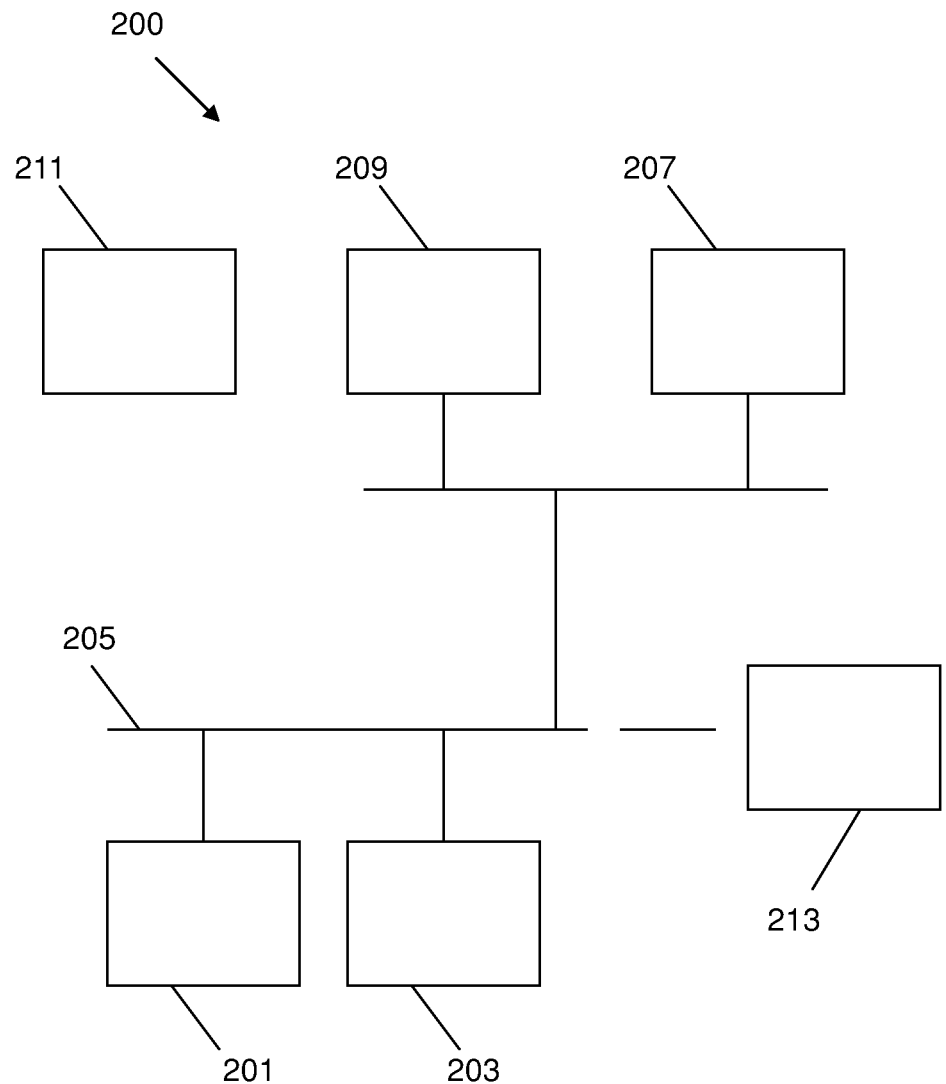
FIG. 2 shows an example fantasy sports system according to some embodiments.

Some embodiments may include a gaming operator that includes one or more systems, such as a fantasy sports system. One example fantasy sports system 200 is illustrated in FIG. 2. As illustrated, fantasy sports system 200 may include a gaming system 201, an event server 203, a network 205, a client computing device 207, a staff computing device 209, a mobile device 211, and an event source 213.

Gaming system 201 may be configured to perform any desired services related to a game. For example, gaming server 201 may receive one or more indications related to a game (e.g., achievement, teams, money, groups, raising, surrender, etc.). gaming system 201 may match players into a game, may form games, may audit games, may determine/provide outcomes of games, may transmit data for interfaces, may act as treasurer or house for a game, may provide gaming opportunities, may perform a method such as one described herein, and so on. In some embodiments, gaming system 201 may allow a player to enter into a game against another player. It should be recognized that gaming system 201 may include any number of systems, computing devices, and/or any desired components.

In some embodiments, gaming system 201 may include an exchange-based gaming system. One example exchange based gaming system is described in U.S. patent application Ser. No. 10/831,375 to Burgis and entitled System and method for managing risk associated with product transactions, which is hereby incorporated herein by reference. In some embodiments, bid and/or offers for a game may be received and games may be formed based on the bids and/or offers.

It should be recognized that the above example of a gaming system is given as a non-limiting example only. In some embodiments, a gaming system 201 may receive an indication of a fantasy sports team on which a game is desired. Gaming system 201 may form a game defined by the team and the accomplishment. Such a game may include one or more gaming system defined characteristics (e.g., odds, payout ratios, handicap, etc.) that may be based on the team and/or the accomplishment.

In some embodiments, a casino or other venue may act as an intermediary (e.g., gaming server) between players. For example, a casino may enter into two offsetting games with two players. In some embodiments, a window of time may be set for particular gaming opportunities (e.g., gaming opportunities for particular teams). The gaming server may accept some games that offset one another so that risk is minimized by the gaming server. Some examples of a gaming portal that may be used in some embodiments are described in U.S. patent application Ser. No. 12/979,546, which is hereby incorporated herein by reference.

Event server 203 may be configured to receive and/or process information regarding events. The events may include real life sporting events. For example, events may include hits, runs, completed passes, incomplete passes, interceptions, catches, bases stole, blocks, three point shots, steals, fumbles, shots on goal, and/or any other information. Events may include events at a recent game and/or events from non-recent games. Events may be received substantially simultaneously as the event happening.

Event server 203 may determine fantasy sport outcomes and/or points based on the events. For example, in an embodiment in which a participant receives a point if a real life player that corresponds to a member of the participant's fantasy sports team scores a touchdown, then the event server may be configured to add a point to the participant when information identifying that the player scored the touchdown is received. In some embodiments, event server 203 may be configured to maintain historical records of event information. Such information may be used periodically to determine outcomes and/or points. In some embodiments, event information may be used to determine performance values for a fantasy sports team.

Some examples of receiving and processing event information are described in U.S. patent application Ser. No. 12/367,566 to Plott and entitled Mobile Gaming Alert, which is hereby incorporated herein by reference.

Network 205 may include any desired communication network or networks. Network 205 may include wired portions and/or wireless portions. Network 205 may include a local network, the internet, and/or any desired network. Network 205 may allow portions of system 200 to communicate among one another and/or outside systems.

Client computing device 207 may include any desired computing device. Client computing device may be configured to allow a participant to enter and/or access information regarding a fantasy sports game. For example, client computing device 207 may include a network connected computer at a casino, at a remote location, and/or at any desired location. Client computing device 207 may include a special purpose computer configured to display sporting statistics, game feeds, game option and so on on one or more displays (e.g., that display an interface such as one described herein). Client computing device 207 may include input and/or output elements for money related to one or more games (e.g., a ticket in ticket out device, a credit card device, a cash dispenser, a cash intake element, etc.). Client computing device 207 may communicate with one or more other elements of system 200, such as gaming system 201 to submit or receive information. System 200 may include any number of client computing devices that may allow any number of participants to play any number of fantasy sports games.

Staff computing device 209 may include a computing device configured to be operated by a staff member of a gaming establishment, such as a casino. Staff computing device 209 may include a device at a sports book at which a participant may tell a staff member about a desired game, the staff member may enter the information to create a game, a bid for a game, a fantasy sports team, an accomplishment, and so on.

Mobile device 211 may include any desired mobile computing device. For example, mobile device 211 may include a mobile telecommunications device such as a cell phone, a mobile gaming device and so on. An example mobile gaming device is described in U.S. patent application Ser. No. 11/868,013 to Lutnick and entitled Game of Chance Processing Apparatus, which is hereby incorporated herein by reference. Other example mobile gaming devices may include tablet computers, smartphones, and so on. Mobile device 211 may communicate over a wireless network, such as a portion of network 205. Mobile device 211 may allow a participant to enter and/or receive information related to a fantasy sports team and/or game.

Event source 213 may include any desired source of information related to events. For example, event source 213 may include a television, an rss feed, a news feed, a news paper publication, an announcer, a web site, a log of events, a phone system, a television, and so on. Event source 213 may be part of system 200 or may be separate form system 200 (e.g., a system run by a sports league or television channel such as ESPN, NFL.com, and so on). Event source may be connected to the internet and provide information about events to system 200.

Various elements of a system may be considered a module. For example, an interface module may receive, transmit, and/or perform any actions for allowing interfaces of any type to function; a gaming module may determine information, process games, determine outcomes, and/or perform any actions for allowing gaming functionality; an accounting module may function to manage accounts; and/or any collections of modules (e.g., that match or do not match elements and/or functions portions that may be described herein) may be used in some embodiments.

It should be recognized that system 200 is given as a non-limiting example only. Various embodiments may include additional, alternative, fewer, different, and so on components as desired. For example, some embodiments may include a web server, an authentication server, and or other servers as desired. It should be recognized that system 200 may not be a singular system, but rather may include various components that may be owned, operated, and/or manufactured by different entities. System 200 and/or one or more components thereof may operate to facilitate gaming such as by performing one or more methods described herein or otherwise. In some embodiments a system, for example, may be part of a cloud computing environment, an over the counter wagering environment, and/or a white labeled gaming service environment.

Player Groupings Examples

Figure 3:
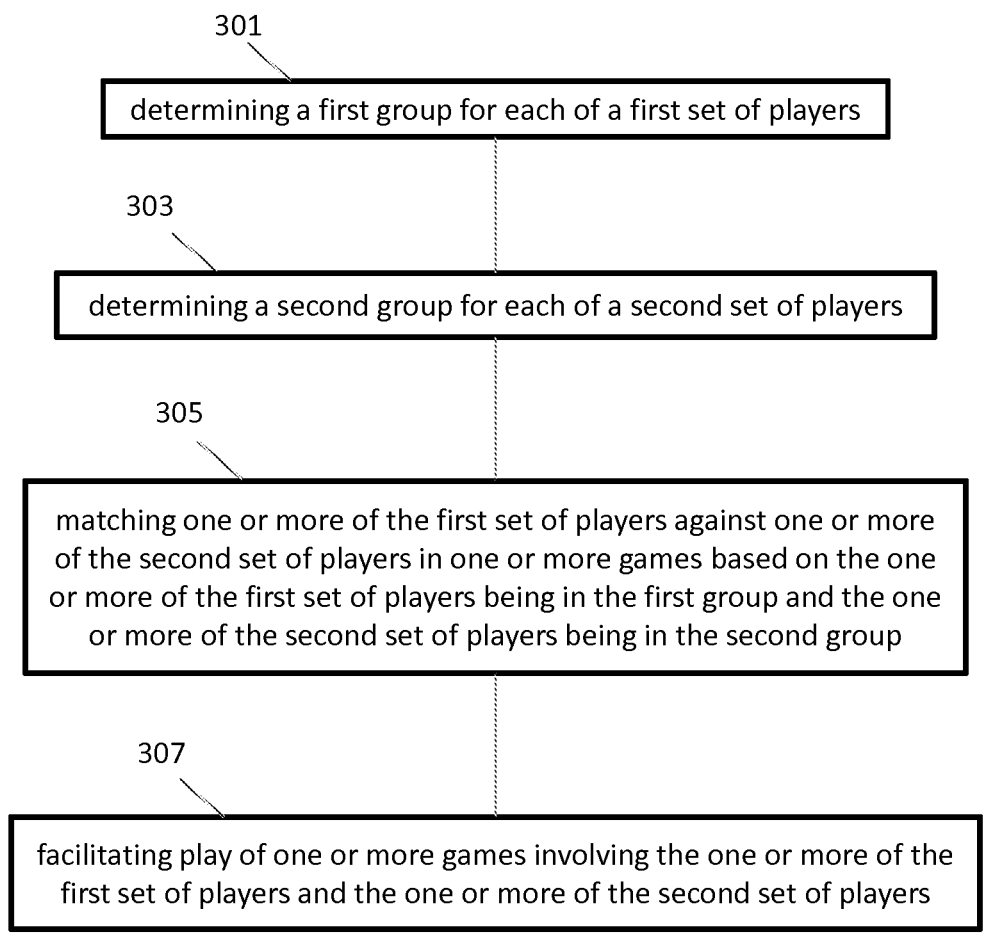
FIG. 3 shows an example process that may be performed in some embodiments.

Some embodiments may include gaming between groups of players. FIG. 3 illustrates an example process that may be performed in some embodiments to facilitate such group-based gaming. Process 300 may begin at block 301 and/or in some other manner (e.g., such as with a registration process as may be discussed elsewhere herein). Process 300 may be performed by system 200 and/or one or more components of system 200 such as gaming system 201, event server 203, a processor, and/or any other device.

As indicated at block 301, some embodiments may include determining a first group for each of a first set of players. The set of players may include any number of players. Such a determination may be made for each player in response to a request from the player to join a group, in response to some characteristic of the player, in response to a request from another to have the player join a group, and/or based on any desired action or characteristic.

As an example, the first group may be a location based group. Players in a particular location may be determined to be part of the first group based on their presence at the location. A location, for example, may be a bar, a state, a college campus, and/or any desired location. Various location determination technologies may be used to make such allocation determination and are known in the art (e.g., gps, location based on wifi connection, ip based location, triangulation, etc.).

A location's affinity (or any characteristic's affinity) to a group may be determined in some embodiments. Such an affinity may be established in response to a request, based on a desire of a gaming operator, randomly, in response to a request from a player, and so on. For example, an owner of a location may request that the location be associated with the group, a gaming operator may determine that users are in a group based on gaming history, a player may form a group with a given characteristic through a user interface, and so on.

A location or other characteristic may be a present location/characteristic and/or a prior location/characteristic. For example, in some embodiments, a location may include a current location so that all and/or some players in a particular location may be determined to be in a first group that is defined by that location. In some embodiments, a location may include a past location so that players that have been in the location are determined to be in the group.

As another example, the location may include one or more prior locations associated with a player. For example, players that have spent more than a threshold amount of time at a location may be determined to be in the group, players that have visited the location more than a threshold number of times may be determined to be part of the group, players that visit the location more than some other location may be in the group, and/or any use of historic and/or current location information may be used to determine membership in one or more groups.

It should be recognized that while some embodiments have been described as including location based groups, that such examples are non-limiting. Groups may be defined by any desired characteristic. For example, groups may be defined as fans of a band, fans of a team, alumni of a school, people with a particular name, people with a particular gender, people that access a particular network, people with children, people with any characteristic whether voluntary or involuntary as desired.

Such group definitions may be determined by request (e.g., from a group founder/sponsor such as a school, bar, member of the group, team, band, etc.) and/or by a gaming operator without a request to form such a group. For example, a group may be formed for a bar so that the bar can play group games against another bar that also has a group in response to a bar owner and/or bar patron requesting that a gaming operator form the group. A location may be defined as the premises of the bar defined by gps coordinates, a location proximate to a gps coordinate of the bar (e.g., within some defined distance), in a geofence that covers the premises of the bar, connected to the wifi network that covers the bar (e.g., in some embodiments players that connect to a particular wifi network may be assigned to that wifi network's associated group), and/or in any other manner. Similarly, any characteristic (e.g., one based on a discrete or continuously measurement) may be defined by a member of a group, a creator of a group, a gaming operator, and so on as desired to define a group.

Some embodiments may include receiving a request to join a group. For example, a player with a location or other characteristic may be eligible to join a group that is based on the location or characteristic but must request to join the group. Players that request without the characteristic may be denied entry into the group. A gaming operator may make a determination as to such eligibility by determining existence of the characteristic.

In some embodiments a player may be placed in a group without such a request. For example, A gaming operator could form groups based on gaming patterns (e.g., you are a Bears fan based on Bears wagers, you are a Packers fan based on Packers wagers). A player may or may not be required to verify entrance into a particular group.

As would be understood as a non-limiting example from the above discussion, one example embodiment of determining that each of the first players is part of the first group may include one or more of determining the first group defined by a first location, determining that each of the first players are and/or have been at the first location, and determining that each of the first players belongs in the first group based on those determinations.

As indicated at block 303, some embodiments may include determining a second group for each of a second set of players. The second set of players may include any number of players. Determination of a group, determination of a characteristic that defines a group, determination of membership of a player to a group, and/or any other actions related to block 303 or the like may take a form that may be similar to a form as discussed above with respect to block 301.

As would be understood as a non-limiting example from the above discussion, one example embodiment of determining that each of the second players is part of the second group may include determining the second group defined by a second location (or other second characteristic that may be of a same or different type than a first characteristic that defines a first group), determining that each of the second players are and/or have been at the second location (and/or have and/or have had the second characteristic), and determining that each of the second players belongs in the second group based on those determinations.

As indicated at block 305, some embodiments may include matching one or more of the first set of players against one or more of the second set of players in one or more games based on the one or more of the first set of players being in the first group and the one or more of the second set of players being in the second group. The players may be matched together in a fantasy game and/or any other game.

A determination may be made that the first group and second group are rival groups. For example, the groups may be affiliated with rival teams, rival locations, rival characteristics, rival bars, and so on. A request may be made from one or more of the groups to initiate a rivalry in some embodiments (e.g., one or more members of a first group may challenge a second group to compete in games). A gaming operator may initiate a rivalry in some embodiments based on such a request or otherwise without such a request. Based on such a determination, matching between members of the groups may be performed. A gaming operator may track rivalries and may allow or disallow games to be played based on those rivalries. In some embodiments all groups may be rivals of all other groups.

Matching may take various forms. For example, in some embodiments, matching may include actively placing a player into a game against another player (e.g., forming a game in a data structure by a gaming operator). In other embodiments, matching may include allowing a player to join a game against another player, removing a restriction on one player joining a game against another player, counting a game between two players as part of a group challenge, and/or any other type of actions that may facilitate some form of gaming between groups. In some embodiments players in a same group may be restricted from play against one another. In some embodiments, only players in rival groups may be allowed to play against one another. In some embodiments any players may play against each other but such play may only qualify for some type of group challenge if the players that play against each other are in rival groups. A gaming operator may track, monitor, enforce, impose, and/or otherwise manager such group play restrictions.

Accordingly, in some embodiments, a location of a player may determine the other players that the player may play against based on the other players' locations. For example, a group of people in a first bar may be matched against players in a second bar to play a bar vs bar fantasy sports game. This type of group-based matching may enable a bar to bar, school to school, state to state, etc. challenge in a gaming environment.

As another example of matching that may be used in some embodiments, a match may be made on a group to group basis. For example, a single game may be played between two groups. In a fantasy sports environment, each group may choose a team and those group teams may play against one another. In some embodiments, a single player from each group may pick the team so that the players are representatives of the groups. The players to be representatives may be chosen by votes from the group, by record in other games, by a gaming operator (e.g., randomly), by a runner of a group, and so on. A gaming operator may facilitate such representative choosing or other group team choosing.

As indicated at block 307, some embodiments may include facilitating play of one or more games involving the one or more of the first set of players and the one or more of the second set of players. A game may include any type of game whether wagering or otherwise. Some embodiments are discussed in terms of a fantasy type game. A game may include individual games and/or group based games. In some embodiments multiple individual games involving individuals from each of the groups may be played. Those games may be used to determine an outcome of a group to group game. Outcomes may be determined in various manners such as those discussed herein or otherwise known in the art (e.g., based on event happenings in real events monitored by a gaming operator to determine a fantasy sports outcome). Winners may be awarded some prize (e.g., based on a buy-in amount).

In some embodiments, a game may include individual games and/or a group challenge. For example, individual players in each group may play against players in another group in individual games. The individual games may aggregate together in some manner to form a group game. For example, a group challenge may be played in which the number of wins by individuals in each group are summed and the group with the most wins wins the group challenge. For example if more people in group 1 win their games against people in group 2 then group 1 wins a group game. As another example of an aggregate outcome, a group that wins by a highest amount win wins are summed may win a group challenge. For example, if more money is won by group 1 than group 2 players then group 1 may win the challenge. Or, as another example, if group 1 teams beat a spread against group 2 teams by a larger amount in sum, then group 1 may win a group challenge. It should be recognized that any manner of aggregating outcome elements may be used to determine an outcome of such a group challenge and these example aggregates are given as non-limiting examples only. A gaming operator may monitor games and groups to determine such an aggregate outcome of a group challenge.

In some embodiments, a group game may be a game that is played by all or some of the group members (e.g., group members that engage in group to group games) and/or other players. For example, in some embodiments, a third party may take a position on which group will win a group challenge (e.g., place a wager on the aggregate outcome). A gaming operator may receive information about such a game, may find an opponent for such a game and/or book a wager on such a game, may monitor the group events and determine an outcome based on the group events.

As another example, a buy-in to a member of a group to member of another group game may fund a group to group game. For example, if $10 is a buy in for each of a member of group 1 and a member of group 2 to play an individual game against one another, some portion of that total $20 buy in money may be used to fund a group to group game. The winning group may win a summed pool of such subgroup buy-in portions. For example $1 of each buy in may go to a group pool. So if 100 members play, the group pool may be $100. A winning group may win that $100. The win money may be split among group members, assigned to a group account, and/or in any other way be credited on to the benefit of the winning group even if individual members of the group lose. So, in some embodiments a player in a group may win money even if the player loses a game.

In some embodiments, a group sponsor may earn the group win. For example, if a bar sponsors a group, an account maintained on behalf of the bar may be credited with the win for the group. A gaming operator may track group sponsors through a data structure, may track group sponsor accounts, and may credit such accounts based on group gaming events. A group sponsor may use the money in whatever manner the sponsor agrees to with the group (e.g., taking as payment for sponsorship, buying free drinks for patrons, upgrading facilities, donating to charity, etc.). A gaming operator may facilitate voting by group members to determine how to use such group winnings.

In some embodiments, a group may elect a recipient for group game wins. For example, the group members may elect (e.g., by entering information into an interface) that a charity receives group game wins. The group members may indicate to a gaming operator that the charity should receive group game wins. The gaming operator may facilitate payment of group game wins to the charity (e.g., crediting an account, mailing a check, etc.).

Some embodiments may include establishing teams for one or more of the games. For example, in embodiments in which individual players in group 1 are matched against and then play respective games against individual players in group 2, the players in each game may pick a fantasy team for that game. Player A from group 1 may play against player B from group 2 and each of player A and player B may pick a team through a user interface to establish their teams for a such a game. Various examples of picking teams are described herein and/or known in the art and may be used in various embodiments.

Some embodiments may include placing a restriction and/or requirement on team selection based on a group membership. It should be recognized that various examples of those restrictions and/or requirements are given as non-limiting examples. Such restrictions and/or requirements may be combined in any manner. A gaming operator may impose such restrictors and/or requirements. A gaming operator may provide information identify such restrictions and/or requirements through an interface. Such interface information may be updated as actions related to restrictions and/or requirements are taken.

For example, in some embodiments, a group in sum must make some selection requirement. A group collectively may be required to use all players on a real sports team at least once. For example, if a group is affiliated with a particular football team, then that members of that group may be required to use every member of that football team at least one time when they collectively form their teams for a set of games. An interface may provide information to members of the group indicating the required players that must still be played. When a member of a group picks a player, an interface for another member of the group may be updated by a gaming operator to indicate that that player has been played. If all of the players are not played, a group may lose, a group may be hit with a penalty, group members may be notified that they must correct the error, and/or any action may be taken. Although examples are given in terms of using a whole team, it should be recognized that any manner of group wide team selection may be used. For example, each player of a team may be required to be used at least some threshold number of times that is greater than one, members of a team may be required to be used collectively at least some number of times by each member may not be required to be used, and so on.

As another example of a restriction/requirement, some embodiments may prevent players in a group from choosing members from certain team(s) and/or require picking at least some members from certain team(s). For example, in some embodiments, each team from a member of group 1 may be required to include at least 3 members of team 1 that is affiliated with group 1. As another example, each team from a member of group 1 may be prevented from including a member from team 2 that is affiliated with group 2 against whom group 1 is playing a game.

It should be recognized that various examples of group gaming given with respect to FIG. 3 are non-limiting examples only. Such examples may be combined together in any manner. Other embodiments may include different, same, more, less, and so on functionality as desired.

Gameplay Examples

Figure 4:
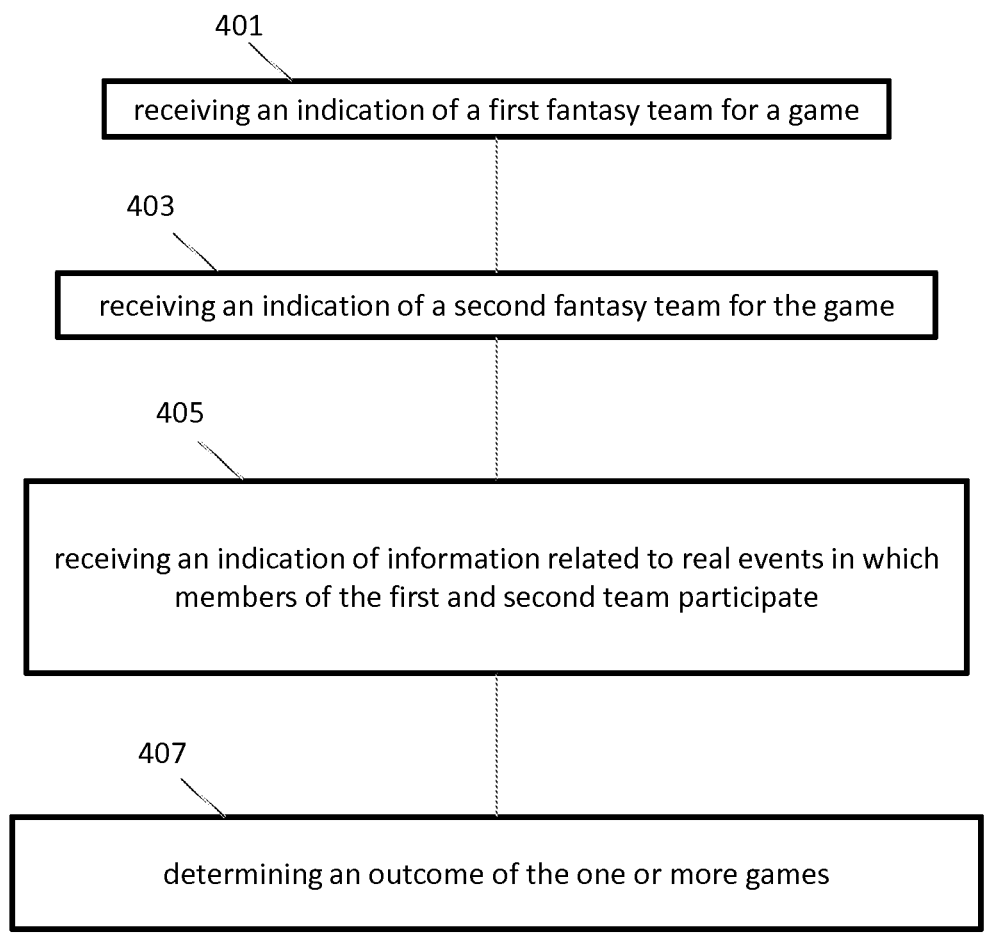
FIG. 4 shows an example process that may be performed in some embodiments.

Some embodiments may include play of one or more games. A gaming operator may take one or more actions to facilitate gameplay involving one or more contestant in a game. In some embodiments, such gameplay may include play of a fantasy game (e.g., fantasy sports game) between two or more contestants (e.g., players, groups, members of rival groups, etc.). FIG. 4 illustrates an example method that may be used to facilitate gameplay in some embodiments.

As indicated at block 401 some embodiments may include receiving an indication of a first fantasy team for a game. The indication may be received from a computing device (e.g., a device operated by a contestant, a client computing device a mobile computing device, staff computing device). In some embodiments, the first fantasy team may include a first plurality of members that each correspond to a respective player of a sport, as discussed above. Such a team may be received from a member of the first group discussed above in an embodiment that involves group gaming.

In some embodiments, the indication may include an indication of each of the members of the fantasy team. In some embodiments, the indication may include an indication of a position for one or more of the members of the fantasy team (e.g., quarterback). In some embodiments, an indication of a fantasy team may include an indication of an outcome of a draft. In some embodiments, an indication of a fantasy team may include an indication of a selection of members of the fantasy team (e.g., by a participant of a fantasy sports game, by a casino as part of a selection of one or more casino teams). Various examples of forming a team are described above and it should be recognized that an indication of such forming may be received in any number of ways in some embodiments.

Some embodiments may include requirements and/or restrictions on team selection (e.g., uniqueness, based on group membership, based on other group members, etc.). Various examples of such requirements are given herein and/or known in the art. Some embodiments may include verifying that the team meets requirements and/or providing information about the requirements and/or retractions to a contestant.

In some embodiments, at least two of the first plurality of members may correspond to a same first player of the sport. It should be recognized that in various embodiments, any number or none of the members may correspond to the same first player. The members may be assigned same or different positions from one another and/or the real player, in various embodiments. In one example, all members on a team may correspond to a same first player. In some embodiments, two or more members of a team may correspond to respective players that play in a same position in the sport even if the sport only allows one player to play that position at one time. For example, in some embodiments, a fantasy team may include multiple members that correspond to players that play as quarterbacks.

It should be recognized that some embodiments may include assigning members to a position and some embodiments may not include assigning members to a position. Such assignment to a position may and/or may not be affected by non-unique members. In some embodiments, non-unique members may not be assigned positions at all and may earn points based on actions of the player regardless of position played by the player. In some embodiments, non-unique members may be assigned positions and may earn points based on actions of the player that are relevant to each assigned position. As discussed above, some embodiments may include non-player members of a fantasy team, such as a head coach and/or fans of a team.

As indicated at block 403, some embodiments may include receiving an indication of a second fantasy team for the game. Such receiving may be substantially similar to the receiving of block 401. The second fantasy team may include a second plurality of members that each correspond to a respective player of the sport. such a team may be received from a member of the second group discussed above in an embodiment that involves group gaming.

In some embodiments, at least one of the second plurality of members corresponds to the same first player of the sport discussed above. In some embodiments, for example, the first fantasy team includes one or more of the first player and the second fantasy team includes one or more of the first player. A combined number of times the first player is included in any number of times may not be limited in some embodiments. A combined number of times the first player is included in any number of times may be limited in some embodiments. In some embodiments, a number of members of a first team and a second team that are common may be limited (e.g., a second team may be rejected or otherwise not allowed to be selected if the number of common members exceeds a threshold number).

Although some fantasy games may include two or more teams, others may include only a single team and block 403 is given as a non-limiting example of games in which two or more teams are part of a game. For example, members of each group may play an over under game based on whether a team chosen by each member scores over or under some score threshold.

In some embodiments, any number of players may select teams for any number of games. Two are shown in blocks for simplicity, but it should be understood that any number may be used. Some examples are given in terms of four or two or other numbers as non-limiting examples only. In a four person example, two more players may choose respective teams in similar fashion to the other teams being chosen. These third and fourth teams may have similar properties to the first and second team. These third and fourth teams may be from members of the first and second group in a group gaming embodiments (e.g., in a game involving multiple players from each group, in different games played between members of the groups). These third and fourth teams may be from members of other groups in a group gaming environment with more than two groups (e.g., between a different set of rival groups, in a game involving four rival groups). In various embodiments, such four teams may play in a single game, a tournament, and/or different games (e.g., one vs two, three vs four).

As indicated at block 405, some embodiments may include receiving an indication of information related to real events in which members of the first and second team participated. Such information may describe happenings in one or more sports. For example, statistics may relate to past performance of one or more players of a sport. For example, a statistic may include a number of completed passes, a number of yards run last game, a number of games played in a career, a current earn run average, a percentage of free throws made, and/or any desired information. Such an indication may be received from an event source (e.g., from a historical database of an event source). It should be recognized that any information regarding one or more members of one or more teams may be received in various embodiments. Such information may include information about prior games. It should be recognized again that any number of teams may be relevant to such an action and that two teams is given as a non-limiting example only.

As indicated at block 407, some embodiments may include determining, based on the respective information, the first fantasy team, and the second fantasy team, a characteristic (e.g., a payout ratio, a spread, other odds, a minimum risked amount, a maximum risked amount, and so on) for a game involving the first fantasy team and/or the second fantasy team (e.g., in games involving two or more teams, may be in response to receiving other teams in embodiments with other teams).

A spread may include an amount of points that one team must win against another team to be considered a win by the one team. A spread may be determined such that a team with players that have better statistics may have to win by at least some number of points to be considered a winning team.

Some embodiments may include determining characteristics related to a game and/or (possible or actual) member of a fantasy team. For example, some embodiments may include determining an expected number of points that a team and/or member may earn in a game. For example, a fantasy team selected by a player and/or casino may include a number of members. A determination of a number of points that each team and/or member may earn in a fantasy game may be determined in some embodiments. In some embodiments, a determination based on such expectation may be used to determine odds, moneyline, payout ratio, spread, and/or other characteristic of a game.

In some embodiments, a skew may intentionally be introduced to such a determination of a characteristic. Such a skew for example may include intentionally lowering an expected points earned by a member of a fantasy team and/or fantasy team in whole than would be expected from statistics. Such a skew may encourage players of a game to select members of the team that are higher performing than they would normally pick (e.g., in cases in which player's prefer to have an underdog team).

A determination of an expected number of points for a member and/or team may include determining a number of points that the member is expected to earn based on historic performance of the player. The data may include information indicative of each participant's ability to contribute to the accomplishment in prior events to the plurality of events. The historic performance may include performance from all prior games, recent prior game, prior games against an opponent (e.g., team, coach, player) that the member will be playing an upcoming real game that may be used as a basis for determining an outcome of a fantasy game, history of home and/or away games, and so on. Various weightings may be given to historic information to make such a determination. For example, recent games may be given more weight than non-recent games in determining an expected points. If an upcoming game is an away game, away games may be given more weight than home games. Games against same opponents may be given more weight than games against different opponents. It should be recognized that any combination of weights and information may be used in determining an expected number of points for a particular member as desired and that examples given are non-limiting. Such information may be displayed through one or more interfaces in some embodiments.

In one particular non-limiting example, player X may have an expected number of points to be earned in an upcoming game. In the past two seasons, player X may have earned an average of 70 points each game. In the current season, the player may have earned 60 points for two of the three games. One of the three games may have been against team A and member may have earned 80 points. Such information may be received in some embodiments. A determination of an expected points may be made by an algorithm that takes such information into account. For example, an expected number of points may be determined such that expected points are equal to 70 times A (e.g., 0.33)+70 times B (e.g., 0.33)+60 times C (e.g., 0.1)+60 times C (e.g., 0.1)+80 times D (e.g., 0.13). In this example embodiment such an expected number of points may equal 68.6. In some embodiments, such an expectation may be skewed down intentionally (e.g., by a set percentage, by a number of points, if it is great than a threshold, etc.) to, for example 65 points.

In some embodiments, a sum of points of each member of a team may be used to determine an expected number of points for a team. For example, a sum of expected points to be earned by members of a team picked by a first player may be used to determine an expected number of points that the first player's team will earn in the game. As another example, a sum of expected points for each member of a player team may be used to determine an expected number of points for a player team to earn in a game.

Some embodiments may include determining a characteristic for a game based on such characteristics of a team. For example, a characteristic of a game may be determined based on expected points of one or more teams and/or one or more members. For example, a spread may be determined for a game involving two teams based on a comparison of expected pointed for each of the teams. For example, as a non-limiting example, if a first team has an expected number of points of 100 and a second team has an expected number of points of 110.5, a spread may be 10.5 points. Such a spread may include an amount of points that a second team may be required to win by in order for a game on the second team to be a winning game. Such information may be presented to a user through an interface (e.g., an interface for selecting a team, an interface for making a game, and so on). In some embodiments, a house edge may be added to one or more sides or teams as desired.

In some embodiments, such an expected points may be used to determine an odds and/or payout ratio (e.g., in combination with an accomplishment). For example, an odds that are worse for the player may be determined if the accomplishment is to achieve points that are less than the expected points and may be better for the player if the accomplishment is to achieve points that are greater than the expected points.

Some embodiments may include determining information about a team as the team and/or members thereof as a team is selected. For example, an interface may display a current expected point total for a team as the team is being select, an amount that each player will add to the team expected point total in a selection interface, and/or other information to aid in the selection of a team. Such information may be used, for example to adjust a team, to verify a game, and so on. Accordingly, it should be understood that orderings of actions are given in a non-limiting manner and that various information may be determined and displayed in order to aid in the formation of a team for one or more players of game that may be used to determine a characteristic of the game.

It should be recognized that various examples of characteristic determination are given as non-limiting examples only. Other embodiments may include any desired methodology. For example, in some embodiments, actual expected events of a real game may be determined (e.g., expected passing yards, expected touchdowns), and based on such expected events, an expected score may be determined. As another example, some embodiments may include adjusting a characteristic based on other games (e.g., if many players the thing a particular team will win, the team may be given an increase in expected points; if a player that has a winning record thinks that a team will win, the team may have an adjustment made to the expected points, and so on). In still other embodiments no such characteristic may be determined at all.

It should be recognized that while points earned in a fantasy game are given as examples of information that may be used to determine characteristics, that any desired characteristic may be determined based on any element of an event (e.g. length of game, number of hits, etc.) that may or may not be translated into points through game rules.

While examples of block 405 are given in terms of a game of two players, it should be recognized that such an action may apply to a game of any number of players. For example, a game of four players may be played and such an action may apply to said game. Multiple games of two played may be played and this action may apply to each said game.

For example, in a four player game, a number of expected points that is a lowest expect points from among the expected points of each of the four teams may be determined. Such a minimum may be set as a zero point for a four player game. Each team of the four teams that has an expected point value higher than that minimum expected point value may be assigned a negative starting value for an amount that an expected point value of that team exceeds the minimum. Accordingly, each team may be penalized for having a higher expected point amount so that the teams compete in a fairer manner. As another example, A highest (or any value) of the expected performance values may be set as a zero point. Other teams may have some starting bonus added to their score in relation to the difference between their score and the highest score to balance out the differences in expected scores. Some embodiments may have some added bonus and some subtracted penalty if a score that is neither the highest nor the lowest is selected as a zero point.

Some embodiments may take one or more actions to form or finalize a game. For example, players may join a league and when a league and/or otherwise be matched together into a game. In response, the players may be charged a fee (e.g., a wager amount, a contest entry fee, an amount of money risked, etc.). When a game has a number of players, the game may be formed. If insufficient players join, the game may be canceled and players may be returned their fee. In some embodiments the fee may be charged at a later time such as when sufficient players join, when a game is otherwise finalized such as after teams are picked, when a spread is set, etc. In some embodiments, a game may be finalized when teams are set and/or a characteristic is established. Forming and/or finalizing a game may include notifying one or more players, adjusting account balances, making entry into a data structure that is used to track a game, and/or any desired actions. In some embodiments, various game related actions may be performed, such as debiting and/or crediting accounts, obtaining signed contracts, collecting chips or money, and so on.

As indicated at block 407, some embodiments may include determining an outcome of the one or more games. The outcome of the game may be determined based on happenings of one or more events. For example, events related to members in the team(s) may be used to determine points for each team, as described above. A comparison of the points may be used to determine the outcome. In some embodiments, determining the outcome may include determining the outcome based on events in one or more games involving the members on one or more fantasy team. Some embodiments may include receiving an indication of the performance of the members (e.g., from an event source).

As discussed above, some embodiments may use the outcomes of one or more games as input to one or more other games. For example, a group game may be based on outcomes of individual games between rival group members. Accordingly, some embodiments may include determining an outcome of a group game based on the outcome of the one or more games.

Some embodiments may include transmitting an indication of a payout amount based on the outcome of the one or more games and/or group game. Such a payout amount may be determined based on the outcome and/or a characteristic of a game (e.g., payout ratio Such an indication may be made to a client. In some embodiments, such an indication may include an indication that a payment was made. In some embodiments, such an indication may be displayed on a display. In some embodiments, such an indication may include an indication to a staff member to pay an amount. In some embodiments, such an indication may include an indication that an amount should be transferred from one account to another account.

It should be recognized that the method of FIG. 4 is given as a non-limiting example only. Other embodiments may include additional, alternative, differently ordered, more, fewer, different, and/or same actions as desired.

Tournament Examples

In some embodiments, one or more game may be part of a tournament and/or may be based on events in a tournament. For example, in some embodiments, a fantasy game may be based on events in a real life tournament (e.g., games in a playoff series, games in a NFL playoffs, etc.).

In some embodiments, teams in a tournament may be kicked out of the tournament if they lose and teams in the tournament may move on to a next level of a tournament if they win. Accordingly, if a player in the game establishes a fantasy team for a game based on the tournament, and one or more of the real players in the tournament are on a team that loses a game in the tournament, that one or more players may no longer be eligible to earn points in the fantasy game (e.g., because he or she will no longer play in real games). Different embodiments may approach this real player elimination in various manners.

For example, in some embodiments, members of a team that are eliminated from a tournament in such a manner may be replaced by a player of the game. A player may be notified of eliminated members and asked to pick replacement members from a set of members that remain active in the tournament. In some embodiments, a restriction may be placed on such replacement selection. For example, a replacement player may be required to be of a lower than and/or equal to expected point total as a replaced player. This restriction would prevent a player from receiving an improved fantasy team as the tournament progresses. The game may continue with the replacement members earning points in the game rather than the replaced players from that point forward.

As another example, in some embodiments members of a team that are eliminated from a tournament in such a manner may not be replaced. A player in the game may rather continue the game having only a diminished team earning points from an elimination forward. Such a rule may add an element of strategy to initial player selection by making players include likelihood of continued play in the tournament into their player selection calculations.

Accordingly, players may play against one another with a changing team over time as real players drop out and/or are added back in as an underlying tournament progresses.

As another example of a game, a game may itself be part of a tournament of games in which winners may move on to a higher level of a tournament and losers may be kicked out of a tournament. In some embodiments, the game may end but the game may be part of tournament so the tournament may move on to a next round in the tournament. For example, a game may involve player 1 vs player 2 and a second game may involve player 3 vs player 4. Players 1 and 3 may win these games. A next round of the tournament may involve a game between player 1 an player 3 in response to the outcome of the first round.

In some embodiments, such a tournament may be played between two groups. For example, an initial matchup in the tournament may be players from group 1 vs players from group 2. If the tournament reaches a point where all remaining players are from a single group, the group may be a group winner of the tournament. For example, if players 1 and 3 are of a same group, that group may win the tournament and some may win some group prize. The play of players in the group may continue to see who in the group wins the overall tournament in some embodiments.

The underlying event(s) on which the tournament is based may include an elimination of real players, and there may or may not be a replenishment phase as discussed above.

Accordingly, play in a first round of a tournament between player 1 vs player 2 and player 3 vs player 4 may be with a set of teams. Members of the teams may drop out of play (e.g., during the round and/or after the round). Then in the next round of the tournament (and/or during a single round if the players drop out during the round in some embodiments), player teams may have been locked. If there are no replacements, those locked teams may have a diminished set of players. Accordingly, player 1 and player 3 may be matched in a game with teams of unequal size. In some embodiments, any characteristic determination may be based on the team with the full size (e.g., such as determining expected points for a team at the start of a tournament and using that number even as players are eliminated). If there is a replacement, then the players may add new members to their teams.

Determination of score expectation (and/or any other characteristic) in a later round of a tournament may take any form. For example, such determination may be based on a full team at a beginning of a tournament (e.g., a par value, spread for a later round of a tournament may be determined based on players in teams at a start of a tournament) and/or a possibly smaller or different set of players that will be used for the round (e.g., determine par and/or spread based on a current set of players). For example, a spread in round 1 of a fantasy tournament that is based on events in a real tournament may be determined based on a difference in expected points of two teams that are put against one another in the first round of the tournament. A first team may win and move on to a second round of the tournament. Some players from the first team may have been eliminated from the real tournament that the fantasy tournament tracks. In round 2 of the tournament a spread may be determined based on an original point expectation of the first team even though players have been eliminated.

A tournament may progress through any number of rounds until an end is reached. A game based on a tournament may be based on an entire tournament and/or a portion of a tournament.

It should be recognized that while various embodiments are given in terms of football, other embodiments are not limited to football. Some embodiments may include other sports and/or other events as desired and may include different rules for different events as desired. For example different sports may include different numbers of players, different game characteristics, and so on. It should be recognized that fantasy sports tournaments are also given as non-limiting examples and that other examples may include any form a tournament involving any form of game (e.g., poker tournament).

Surrender Examples

Some embodiments may include an ability to end a game earlier than is normally scheduled. For example, a game may include a fantasy sports game that is based on real sport events happening over a weekend. Players in the fantasy sports game may desire to end the game before all of the events are over.

Some embodiments may include a first player in a fantasy sports game indicating to a gaming operator that they desire to offer another player in the fantasy sports game an option to end the game early. For example, a first player may offer a second player an amount of money to end the game now. The offered amount of money may be less than an amount of money that the player would be awarded if the player wins the game.

A gaming operator may present the offered player with information about the offer to end the game early (e.g., information indicated the offered amount of money, information indicating a current state of the game, etc.).

The offered player may respond to such an offer through a user interface of a computing device. For example, the offered player may accept, reject, and/or ignore the offer. If the player rejects and/or ignores the offer, the game may continue as if the offer was not made. If the player accepts the offer, the offered player may be awarded the amount of money offered and the game may end. Such an offer and ending of a game may be referred to as a buyout.

An offer and/or buy-out may operate in many different manners. For example, some embodiments include two players that each pay a buy-in amount to play the game (e.g., $10). A gaming operator may take a portion of the buy-in amounts as a payment for playing the game (e.g., $2 total leaving $18). A remainder may be a prize pool for winning the game (e.g., $18). An offer to end the game may identify an amount of the prize pool that the offered player will receive if he or she accepts the offer (e.g., a player may offer another player 5$ of the $18 to end the game). An offered amount may be half a prize pool, more than half a prize pool, and/or less than half a prize pool. Some embodiments may restrict a player to making some types of offers (e.g., restrict to offering more than half the prize pool thereby admitting a likely loss). In another embodiment, an amount offered may be an amount more than a midpoint of the prize pool (e.g., a 5$ offer may indicate that the offered party would receive $5 more than 50% of the prize pool or $14). A offering party may receive whatever amount is left in the prize pool after the offered party is awarded the offered amount. A gaming operator may monitor offers and acceptances and adjust accounts form the prize pool accordingly.

Some embodiments may include a negotiation between players to resolve a surrender or buyout option. For example, a first player may offer a second player a buyout. The second player may respond with a counteroffer through a gaming operator interface. A back and forth counter offering process may proceed with any number of rounds as a game progresses. Offers may change to reflect changing circumstances of a game. In some embodiments, each player may enter an amount that they would accept as a buyout and/or offer as a buyout as the game progresses. Such amounts may or may not be show to opposing players. In some embodiments, if the amounts ever match and/or an agreement is ever reached, a game may end with the matched buyout occurring. In some embodiments, a player may cancel and/or alter an offer that is made before it is accepted and/or after some amount of time after it is made.

Such offering may be available in any form of game involving any number of players. For example, group games may involve offers between groups, tournament game may involve offers at a level of a tournament (e.g., a winner in a round may be a player that takes more than half of a prize pool) and/or for a tournament as a whole (e.g., in a final round of a tournament), and so on.

Customizable Games Examples

In some embodiments, one or more players may have influence on how a winner of a game is determined. A player, for example, may establish rules for a game and/or determine the inputs into a game that are used to determine a score for the game. In a fantasy sports game, for example, statistics related to and/or happenings in real sports may affect the score of the fantasy game. The specific statistics and/or happenings that count for points in the fantasy game may be chosen by one or more players in the game.

For example, in some embodiments, a player may be shown a list of possible statistics and/or happenings that may be included in a game. The user may select from the list a set that should be included to determine scores in the game. A gaming operator may use the selection to determine scores in the game.

In some embodiments, a minimum number of statistics and/or happenings may be required to be selected (e.g., 5). In some embodiments, no more than some maximum may be allowed to be selected (e.g., 7). In some embodiments, more than one user may select such statistics and/or happenings (e.g., a round robin selection, each player may select some number, etc.). In some embodiments a single player may select such statistics and/or happenings (e.g., a first player to join a game). In some embodiments, groups may select such events/happenings (e.g., in a round robin fashion) and such group selections may apply to all games played between groups.

Some examples, statistics and/or happenings may include 3 point shooting percentage, running yards, passing yards, QB completion percentage, batter's on-base percentage, conventional events used in conventional fantasy games, any statistic and/or happening that may occur in a real event, and so on.

In some embodiments, a player may define how scores within a statistic and/or happening are assigned scores. In some embodiment, a gaming operator may determine how such statistics and/or happenings are translated into scores. For example, the scoring breakdown for a category such as QB completion percentage could be as follows:

| | |
|---|---|
| 90% & Above | 25 Points |
| 80%-89% | 20 Points |
| 70%-79% | 15 Points |
| 60%-69% | 10 Points |
| 50%-59% | 5 Points |
| 40%-49% | 1 Point |
| 30%-39% | −1 Point |
| Below 30% | −5 Points |

It should be recognized that examples of statistics and/or happenings are given as non-limiting examples only. It should be recognized that example scorings are given as non-limiting examples only. It should be recognized that examples of picking statistics and/or happenings are given as on-limiting examples only.

Raising Examples

Some embodiments may include one or more players in a game increasing the stakes of the game. For example, in a fantasy sports game, one user may offer to increase the stakes of the game to another user. The other user may accept, reject, and/or offer to differently increase the stakes in response.

As an example, in some embodiments, two users may be placed in a fantasy sports head to head game. Either of the two players in the game may be able to offer the other play a doubling of the stakes of the game. A gaming operator may receive such an offer and present it to the other player in the game in response.

In some embodiments, if a receiving player does not accept a doubling or other raising offer, the receiving party may lose the game. In other embodiments, if not accepted, the game may go forward at an original stakes. In some embodiments, the raising offer may only be made before a game starts. In some embodiments, the raising offer may be made at any time and/or at a time before some percentage of underlying events have occurred.

In some embodiments, if a receiving party accepts a raise, both players may then place an additional amount of money into a prize pool to account for the raise. For example, if an initial buy-in to a game is $10 each, then a doubling may cause the buy in to increase to $20 each. In some embodiments 10% of the increase and/or some other portion of the increase may be taken by a gaming operator as a charge for playing the game.

In some embodiments both users may have the ability to offer a raise (e.g., a doubling). For example, a first or second player to join the game may have the option of offering a raise. In some embodiments, either player may have the option of making such an offer.

In some embodiments, a raise offer may be made more than one time in a game. For example, after a first player offers a raise to a second player and the second player accepts, the stake may be doubled. The second player may have the option to offer an additional raise to the first player (e.g., another doubling). The first player may no longer have the raise option. The second raise may operate similar to the first raise (e.g., may be required to be accepted or else forfeit the game). In some embodiments with more than two raisings being allowed, this option may bounce back and forth.

In some embodiments, there may be a limit on the number of times this raising may occur (e.g., once by each player, ten times total). Such limiting may prevent a rich player from crowding out other players by continuously offering raises. In some embodiments, a game that allows such an option may be identified separately from games that do not allow such an option so that users are aware of the game type they are entering.

Par Game Example

Some embodiments may include a game in which players seek to reach some par level. Achievement of par may result in the player that reaches par being a winner. Accordingly, in some embodiments multiple players may be winners. Winners may split a prize pool. In some embodiments, a secondary game may determine winners from among a set of winners. For example, a highest scoring player may win, a first to achieve par may win, and/or any other secondary characteristic may be used to determine a winner from a set of winners. In some embodiments there may be no winners if no one achieves par. In some embodiments, a secondary characteristic may be used to determine a winner if no one achieves par (e.g., highest scoring player, etc.).

Some embodiments may include determining a par value for a game. Such a par value may be based upon teams in the game. The game may include a fantasy sports game between any number of players. A par value may be determined based on expected scores to be earned by the teams. For example, the par value may be equal to the average of expected points, the lowest of the expected points, a highest of the expected points, and so on. In some embodiments, teams may start with some points based on expected points and/or par. For example, par may be set to a lowest expected point value and each team may be assigned some number of negative points to start based on the difference between the par value and the expected points of the team. This offsetting value (which may be positive in some embodiments) may be referred to as a handicap.

Some embodiments may include determining which teams meet a par value. For example, some embodiments may include determining every team from a group of teams involved in a game that meet the par value. Those teams may be winning teams and may split a prize pool. As another example, some embodiments may include determining which teams meet a par value first and that team may be a winning team. Determining which teams meet a par value may include determining scores of the teams for real events and comparing that score to the par value. Some embodiments may include adding or subtracting a handicap value to such a comparison.

Multiple Access Points Examples

Some embodiments may include offering a gaming service through a plurality of service providers. A gaming service may operate as a white labeled service that appears to be directly offered through the service providers but is in realty offered by the gaming provider. Such a service by a gaming provider may allow its services to be offered seamlessly as part of a suite of services offered by a service provider. Customers may trust the service provider and/or have accounts with the service provider and may be able to user the gaming service in an easier and/or a more trusted environment through such a service provider rather than directly with the gaming operator.

In some embodiments, a customer may establish an account with a service provider. A service provider may include a casino, a website, a poker site, a slot machine provider, a sports book, and/or any provider of any services whether they are internet based, physical based, gaming and/or otherwise. Establishing an account may include any manner of identifying a user to a service, such as method that may be well known in the art. Establishing an account may include establishing some amount of money in a monetary account and establishing some identity information such as a login.

Some embodiments may not include such an account. For example, in some embodiments, an over the counter option may be facilitated to allow play of games without an account and/or player identification. Such an over the counter option may allow for a user to play games over the counter and/or in a physical environment without the use for an account (e.g., by submitting gaming information to a agent of a service provider).

In some embodiments, a gaming operator may maintain an account for a user. For example, a single sign in may be used across accounts for a gaming operator and service provider so that a sign into one is a sign into another. A sign in to a service operator may act as a signing into a gaming operator even if the user does not realize that there is multiple signing ins occurring. A service operator may transmit information to a gaming operator to facilitate signing in to the gaming operator and/or to track player actions so that players taking gaming actions may be tracked.

Some embodiments may include providing a user with access to one or more services by a service provider. The one or more services may include any desired gaming and/or non-gaming service (e.g., such as those provided through a cloud or cloud service providers that are accessible through a portal into the cloud). For example, a casino may offer a variety of commercial options to a user that may include some gaming options. One of those options may include services provided by a gaming operator. Such services may be offered through an interface of a device (e.g., a computing device, a cell phone, a kiosk, etc.).

In some embodiments, such service may be offered through device and/or personnel of a casino or other service provider. For example, in a system that does not include an account and/or otherwise offers over the counter gaming options, an agent and/or device of a service provider may offer an interface to such gaming services and/or other services. For example, an agent at a counter may accept wagers on games and transmit such information to a gaming operator on behalf of a customer that desires to play the games.

In some embodiments, a user may access the services through a service provider portal (e.g., API, user interface, website, kiosk). A service provider may receive information that is usable to play games with the gaming operator and may forward the information to the gaming operator. The information may be marked in some manner to identify a user and/or gaming session. The gaming operator may respond with information identifying gaming actions and/or outcomes. Such information may be forwarded to the user. Accordingly, the service provider may act as an access point to the gaming operator. In an over the counter example, a kiosk and/or agent of a service provider may receive gaming actions such as wagers in a game and may enter that information to the gaming provider. Accordingly the service provider may act as an agent or entry point for the gaming operator. Users may not know that the gaming operator is involved in the game play but rather may assume that the service provider offers the gaming services.

A gaming operator may receive various information and facilitate gaming using the information. The received information may be used to play games as discussed elsewhere herein. Outcome information may be sent to the service operator for display to the users. Accordingly, processing and play of games may be done through the gaming operator but access and/or presentation may be done through the service provider. It should be recognized that various examples of functionality breakdown are given as non-limiting examples only.

A service provider may include one or more computing devices that provide functionality for the service provider. For example, such computing devices may provide account based functions, commercial transaction functions, display functions, sign in functions and so on. A gaming operator may include one or more computing devices that may provide gaming operator functions. A gaming operator and service provider devices may interact in order to provide gaming services to a user (e.g., through a user computing device).

In various options, funding may be performed in a manner that facilities gaming as desired by a gaming operator and/or service provider. For example, in some embodiments, an account may be maintained by a gaming operator and the user may have to somehow log in to that account (e.g. in addition to the account of the service provider). The money in the account may be limited to use with the gaming operator. In another example, an account may be maintained by the service provider and singing in to the account by the service provider may act as a singing in to the gaming operator as well. A service provider may transfer money to the gaming operator for use in gaming with the gaming operator by the player. Accordingly, a monetary account with the service provider may be used at the gaming operator and/or for any services offered by the service provider.

Various communications may be made between the gaming operator and the service provider and/or the customers to facilitate gaming. A service provider may identify customers in any manner so that they may be communicated back to the service provider and properly identify a user and/or game. For example, each user may have an ID number and that ID number may be communicated back and forth to indicate gaming actions, account transaction, payments, team selections, and so on that relate to the user. Similarly, a ID may be assigned to a game by a gaming operator that may be communicated back and forth to indicate information is related to the game. A service provider may be responsible for presentation and obtainment of information. A gaming operator may be responsible for calculation of games and outcomes.

In some embodiments, in an over the counter option, a player may not be identified, but rather a game may be identified. For example, a player may not have an account at all, but rather may pay to be part of game through a counter and/or kiosk. A ticket may track that specific game and may be used to redeem any winnings. A ticket may be printed with a game ID that may be used by a gaming operator and/or service provider to take game actions and/or obtain information about an outcome of the game. A payment may be made from the gaming operator and/or service provider based on an outcome of the game by looking up the outcome by referring the game ID.

A service provider may take a cut of the amount of money input into the gaming operator through an over the counter and/or white label method. Some embodiments may include determine an allocation of such a cut to the service provider and/or determining a similar cut to a gaming operator. For example, 50% of a fee that is charged by the gaming operator may be shared with the service provider for providing the customers to the gaming operator.

Customers from various services providers may interact through the gaming operator. Customers with different access methods may interact through the gaming operator. Customers that are direct customers of the gaming operator may direct with such indirect customers of the gaming operator. Players from different sources may interact to play games against one another. Accordingly, by offering such white labeled and/or over the counter gaming options a larger group of players may interact with one another. Different fees may be charged and/or shared depending on a source of a player to a game.

For example, players at different casinos may play games over the counter against one another. The players may not know that they are playing against such other players and may think that they are playing games at the casino with other casino patrons. They may not care who they are playing against because the service provider and/or gaming provider may be trusted to properly resolve all games according to the standard rules regardless of player source. As another example, a player may play over the counter against a player with an account. Again the players may not care about how their opponents access a gaming service because the results may be the same from their point of view. Allowing such variety of access methods and connections to a gaming operator may increase a player base of a gaming operator thereby enhancing play options and experience available through a particular gaming operator.

It should be recognized that while some example access methods and communication between access methods are described, that such methods are given as non-limiting examples only. Other embodiments may include any methods or structure to facilitate interoperability between service providers and gaming operators.

It should be recognized that while example games, systems, and methods are described, that such examples are given as non-limiting examples only. Other embodiments may include any desired combination of elements described herein and/or other elements as desired.

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. § 1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth □, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VIII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

X. Incorporation by Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Such person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XII. Cards

Playing cards have been in existence for many years. Although there are many types of playing cards that are played in many different types of games, the most common type of playing cards consists of 52 cards, divided out into four different suits (namely Spades, Hearts, Diamonds and Clubs) which are printed or indicated on one side or on the face of each card. In the standard deck, each of the four suits of cards consists of 13 cards, numbered either two through ten, or lettered A (Ace), K (King), Q (Queen), or J (Jack), which is also printed or indicated on the face of each card. Each card will thus contain on its face a suit indication along with a number or letter indication. The King, Queen, and Jack usually also include some sort of design on the face of the card, and may be referred to as picture cards. Other types of playing cards are described herein, but it should be recognized that various topics may apply to any, some, and/or all type of playing cards.

In some cases, the 52 card standard playing deck also contains a number of extra cards, sometimes referred to as jokers, that may have some use or meaning depending on the particular game being played with the deck. For example, if a card game includes the jokers, then if a player receives a joker in his "hand" he may use it as any card in the deck. If the player has the ten, jack, queen and king of Spades, along with a joker, the player would use the joker as an Ace of Spades. The player will then have a Royal Flush (ten through Ace of Spades).

Many different games can be played using a standard deck of playing cards. The game being played with the standard deck of cards may include other items, such as game boards, chips, etc., or the game being played may only need the playing card deck itself. In most of the games played using a standard deck of cards, a value is assigned to each card. The value may differ for different games.

Usually, the card value begins with the number two card as the lowest value and increases as the numbers increase through ten, followed in order of increasing value with the Jack, Queen, King and Ace. In some games the Ace may have a lower value than the two, and in games where a particular card is determined to be wild, or have any value, that card may have the greatest value of all. For example, in card games where deuces, or twos, are wild, the player holding a playing card containing a two can use that two as any other card, such that a nine and a two would be the equivalent of two nines.

Further, the four different suits indicated on the cards may have a particular value depending on the game. Under game rules where one suit, i.e., Spades, has more value than another suit, i.e., Hearts, the seven of Spades may have more value than the seven of Hearts.

It is easy to visualize that using the different card quantity and suit values, many different games can be played. In certain games, it is the combination of cards that one player obtains that determines whether or not that player has defeated the other player or players. Usually, the more difficult the combination is to obtain, the more value the combination has, and the player who obtains the more difficult combination (also taking into account the value of the cards) wins the game.

For instance in the game of Poker, each player may ultimately receive five cards. The player who obtains three cards having similar numbers on their face, i.e., the four of Hearts, four of Diamonds and four of Clubs, will defeat the player having only two cards with the same numerical value, i.e., the King of Spades and the King of Hearts. However, the player with five cards that all contain Clubs, commonly known as a flush, will defeat the player with the same three of a kind described above.

In many instances, a standard deck of playing cards is used to create gaming machines. In these gaming machines players insert coins and play certain card games, such as poker, using an imitation of standard playing cards on a video screen, in an attempt to win back more money than they originally inserted into the machine.

Another form of gambling using playing cards utilizes tables, otherwise known as table games. A table uses a table and a dealer, with the players sitting or standing around the table. The players place their bets on the table and the dealer deals the cards to each player. The number of cards dealt, or whether the cards are dealt face up or face down, will depend on the particular table game being played.

Further, an imitation or depiction of a standard playing card is used in many handheld electronic games, such as poker and blackjack, and in many computer games and Internet games. Using a handheld electronic game or a computer terminal that may or may not be connected to the Internet, a player receives the imitation playing cards and plays a card game either against the computer or against other players. Further, many of these games can be played on the computer in combination with gambling.

Also, there are many game shows that are broadcasted on television that use a deck of playing cards in the game play, in which the cards are usually enlarged or shown on a video screen or monitor for easy viewing. In these television game shows, the participants play the card game for prizes or money, usually against each other, with an individual acting as a host overseeing the action.

Also, there are lottery tickets that players purchase and play by "scratching off" an opaque layer to see if they have won money and prizes. The opaque layer prevents the player from knowing the results of the lottery ticket prior to purchasing and scratching off the layer. In some of these lottery tickets, playing cards are used under the opaque layer and the player may need to match a number of similar cards in order to win the prizes or money.

XIII. Rules of Card Games

Rules of Poker

In a basic poker game, which is played with a standard 52-card deck, each player is dealt five cards. All five cards in each player's hand are evaluated as a single hand with the presence of various combinations of the cards such as pairs, three-of-a-kind, straight, etc. Determining which combinations prevail over other combinations is done by reference to a table containing a ranking of the combinations. Rankings in most tables are based on the odds of each combination occurring in the player's hand. Regardless of the number of cards in a player's hand, the values assigned to the cards, and the odds, the method of evaluating all five cards in a player's hand remain the same.

Poker is a popular skill-based card game in which players with fully or partially concealed cards make wagers into a central pot. The pot is awarded to the player or players with the best combination of cards or to the player who makes an uncalled bet. Poker can also refer to video poker, a single-player game seen in casinos much like a slot machine, or to other games that use poker hand rankings.

Poker is played in a multitude of variations, but most follow the same basic pattern of play.

The right to deal each hand typically rotates among the players and is marked by a token called a 'dealer' button or buck. In a casino, a house dealer handles the cards for each hand, but a button (typically a white plastic disk) is rotated clockwise among the players to indicate a nominal dealer to determine the order of betting.

For each hand, one or more players are required to make forced bets to create an initial stake for which the players will contest. The dealer shuffles the cards, he cuts, and the appropriate number of cards are dealt to the players one at a time. Cards may be dealt either face-up or face-down, depending on the variant of poker being played. After the initial deal, the first of what may be several betting rounds begins. Between rounds, the players' hands develop in some way, often by being dealt additional cards or replacing cards previously dealt. At the end of each round, all bets are gathered into the central pot.

At any time during a betting round, if a player makes a bet, opponents are required to fold, call or raise. If one player bets and no opponents choose to match the bet, the hand ends immediately, the bettor is awarded the pot, no cards are required to be shown, and the next hand begins. The ability to win a pot without showing a hand makes bluffing possible. Bluffing is a primary feature of poker, one that distinguishes it from other vying games and from other games that make use of poker hand rankings.

At the end of the last betting round, if more than one player remains, there is a showdown, in which the players reveal their previously hidden cards and evaluate their hands. The player with the best hand according to the poker variant being played wins the pot.

The most popular poker variants are as follows:

Draw poker

Players each receive five—as in five-card draw—or more cards, all of which are hidden. They can then replace one or more of these cards a certain number of times.

Stud poker

Players receive cards one at a time, some being displayed to other players at the table. The key difference between stud and 'draw' poker is that players are not allowed to discard or replace any cards.

Community card poker

Players combine individually dealt cards with a number of "community cards" dealt face up and shared by all players. Two or four individual cards may be dealt in the most popular variations, Texas hold 'em and Omaha hold 'em, respectively.

Poker Hand Rankings

Straight flush

A straight flush is a poker hand such as Q♠ J♠ 10♠ 9♠ 8♠, which contains five cards in sequence, all of the same suit. Two such hands are compared by their high card in the same way as are straights. The low ace rule also applies: 5♦ 4♦ 3♦ 2♦ A♦ is a 5-high straight flush (also known as a "steel wheel"). An ace-high straight flush such as A♣ K♣ Q♣ J♣ 10♣ is known as a royal flush, and is the highest ranking standard poker hand (excluding five of a kind).

Examples:

7♥ 6♥ 5♥ 4♥ 3♥ beats 5♠ 4♠ 3♠ 2♠ A♠

J♣ 10♣ 9♣ 8♣ 7♣ ties J♦ 10♦ 9♦ 8♦ 7♦

Four of a Kind

Four of a kind, or quads, is a poker hand such as 9♣ 9♠ 9♦ 9♥ J♥, which contains four cards of one rank, and an unmatched card. It ranks above a full house and below a straight flush. Higher ranking quads defeat lower ranking ones. Between two equal sets of four of a kind (possible in wild card and community card games), the kicker determines the winner.

Examples:

10♣ 10♦ 10♥ 10♠ 5♦ ("four tens" or "quad tens") defeats 6♦ 6♥ 6♠ 6♣ K♠ ("four sixes" or "quad sixes")

10♣ 10♦ 10♥ 10♠ Q♣ ("four tens, queen kicker") defeats 10♣ 10♦ 10♥ 10♠ 5♦ ("four tens with a five")

Full House

A full house, also known as a boat or a full boat, is a poker hand such as 3♣ 3♠ 3♦ 6♣ 6♥, which contains three matching cards of one rank, plus two matching cards of another rank. It ranks below a four of a kind and above a flush. Between two full houses, the one with the higher ranking set of three wins. If two have the same set of three (possible in wild card and community card games), the hand with the higher pair wins. Full houses are described by the three of a kind (e.g. Q-Q-Q) and pair (e.g. 9-9), as in "Queens over nines" (also used to describe a two pair), "Queens full of nines" or simply "Queens full".

Examples:

10♠ 10♥ 10♦ 4♠ 4♦ ("tens full") defeats 9♥ 9♣ 9♠ A♥ A♣ ("nines full")

K♠ K♣ K♥ 3♦ 3♠ ("kings full") defeats 3♠ 3♥ 3♦ K♠ K♦ ("threes full")

Q♥ Q♦ Q♣ 8♥ 8♠ ("queens full of eights") defeats Q♥ Q♦ Q♣ 5♠ 5♥ ("queens full of fives")

Flush

A flush is a poker hand such as Q♣ 10♣ 7♣ 6♣ 4♣, which contains five cards of the same suit, not in rank sequence. It ranks above a straight and below a full house. Two flushes are compared as if they were high card hands. In other words, the highest ranking card of each is compared to determine the winner; if both have the same high card, then the second-highest ranking card is compared, etc. The suits have no value: two flushes with the same five ranks of cards are tied. Flushes are described by the highest card, as in "queen-high flush".

Examples:

A♥ Q♥ 10♥ 5♥ 3♥ ("ace-high flush") defeats K♠ Q♠ J♠ 9♠ 6♠ ("king-high flush")

A♦ K♦ 7♦ 6♦ 2♦ ("flush, ace-king high") defeats A♥ Q♥ 10♥ 5♥ 3♥ ("flush, ace-queen high")

Q♥ 10♥ 9♥ 5♥ 2♥ ("heart flush") ties Q♠ 10♠ 9♠ 5♠ 2♠ ("spade flush")

Straight

A straight is a poker hand such as Q♣ J♠ 10♣ 9♥ 8♥, which contains five cards of sequential rank, of varying suits. It ranks above three of a kind and below a flush. Two straights are ranked by comparing the high card of each. Two straights with the same high card are of equal value, and split any winnings (straights are the most commonly tied hands in poker, especially in community card games). Straights are described by the highest card, as in "queen-high straight" or "straight to the queen".

A hand such as A♣ K♣ Q♦ J♠ 10♠ is an ace-high straight, and ranks above a king-high straight such as K♥ Q♠ J♥ 10♥ 9♦. But the ace may also be played as a 1-spot in a hand such as 5♠ 4♦ 3♦ 2♠ A♣, called a wheel or five-high straight, which ranks below the six-high straight 6♠ 5♠ 4♣ 3♥ 2♥. The ace may not "wrap around", or play both high and low in the same hand: 3♣ 2♦ A♠ K♠ Q♣ is not a straight, but just ace-high no pair.

Examples:

8♠ 7♠ 6♥ 5♥ 4♠ ("eight-high straight") defeats 6♦ 5♠ 4♦ 3♥ 2♣ ("six-high straight")

8♠ 7♠ 6♥ 5♥ 4♠ ties 8♥ 7♦ 6♣ 5♣ 4♥

Three of a Kind

Three of a kind, also called trips, set or a prile, is a poker hand such as 2♦ 2♠ 2♥ K♠ 6♠, which contains three cards of the same rank, plus two unmatched cards. It ranks above two pair and below a straight. Higher ranking three of a kind defeat lower ranking three of a kinds. If two hands have the same rank three of a kind (possible in games with wild cards or community cards), the kickers are compared to break the tie.

Examples:

8♠ 8♥ 8♦ 5♠ 3♣ ("three eights") defeats 5♣ 5♥ 5♦ Q♦ 10♣ ("three fives")

8♠ 8♥ 8♦ A♣ 2♦ ("three eights, ace kicker") defeats 8♠ 8♥ 8♦ 5♠ 3♣ ("three eights, five kicker")

Two Pair

A poker hand such as J♥ J♣ 4♣ 4♠ 9♠, which contains two cards of the same rank, plus two cards of another rank (that match each other but not the first pair), plus one unmatched card, is called two pair. It ranks above one pair and below three of a kind. Between two hands containing two pair, the higher ranking pair of each is first compared, and the higher pair wins. If both have the same top pair, then the second pair of each is compared. Finally, if both hands have the same two pairs, the kicker determines the winner. Two pair are described by the higher pair (e.g., K♥ K♣) and the lower pair (e.g., 9♠ 9♦), as in "Kings over nines", "Kings and nines" or simply "Kings up".

Examples:

K♥ K♦ 2♣ 2♦ J♥ ("kings up") defeats J♦ J♠ 10♠ 10♣ 9♠ ("jacks up")

9♣ 9♦ 7♦ 7♠ 6♥ ("nines and sevens") defeats 9♥ 9♠ 5♥ 5♦ K♣ ("nines and fives")

4♠ 4♣ 3♠ 3♥ K♦ ("fours and threes, king kicker") defeats 4♥ 4♦ 3♦ 3 10♠ ("fours and threes with a ten")

One Pair

One pair is a poker hand such as 4♥ 4♣ K♠ 10♦ 5♠, which contains two cards of the same rank, plus three unmatched cards. It ranks above any high card hand, but below all other poker hands. Higher ranking pairs defeat lower ranking pairs. If two hands have the same rank of pair, the non-paired cards in each hand (the kickers) are compared to determine the winner.

Examples:

10♣ 10♠ 6♠ 4♥ 2♥ ("pair of tens") defeats 9♥ 9♣ A♥ Q♦ 10♦ ("pair of nines")

10♥ 10♦ J♦ 3♥ 2♣ ("tens with jack kicker") defeats 10♣ 10♠ 6♠ 4♥ 2♥ ("tens with six kicker")

2♦ 2♥ 8♠ 5♣ 4♣ ("deuces, eight-five-four") defeats 2♣ 2♠ 8♣ 5♥ 3♥ ("deuces, eight-five-three")

High Card

A high-card or no-pair hand is a poker hand such as K♥ J♣ 8♣ 7♦ 3♠, in which no two cards have the same rank, the five cards are not in sequence, and the five cards are not all the same suit. It can also be referred to as "nothing" or "garbage," and many other derogatory terms. It ranks below all other poker hands. Two such hands are ranked by comparing the highest ranking card; if those are equal, then the next highest ranking card; if those are equal, then the third highest ranking card, etc. No-pair hands are described by the one or two highest cards in the hand, such as "king high" or "ace-queen high", or by as many cards as are necessary to break a tie.

Examples:

A♦ 10♦ 9♠ 5♣ 4♣ ("ace high") defeats K♣ Q♦ J♠ 8♥ 7♥ ("king high")

A♣ Q♠ 7♦ 5♥ 2♣ ("ace-queen") defeats A[ 10♦ 9♠ 5♣ 4♣ ("ace-ten")

7♠ 6♠ 5♣ 4♦ 2♥ ("seven-six-five-four") defeats 7♣ 6♦ 5♦ 3♥ 2♣ ("seven-six-five-three")

Decks Using a Bug

The use of joker as a bug creates a slight variation of game play. When a joker is introduced in standard poker games it functions as a fifth ace, or can be used as a flush or straight card (though it can be used as a wild card too). Normally casino draw poker variants use a joker, and thus the best possible hand is five of a kind, as in A♥ A♦ A♣ A♠ Joker.

Rules of Caribbean Stud

Caribbean Stud™ poker may be played as follows. A player and a dealer are each dealt five cards. If the dealer has a poker hand having a value less than Ace-King combination or better, the player automatically wins. If the dealer has a poker hand having a value of an Ace-King combination or better, then the higher of the player's or the dealer's hand wins. If the player wins, he may receive an additional bonus payment depending on the poker rank of his hand. In the commercial play of the game, a side bet is usually required to allow a chance at a progressive jackpot. In Caribbean Stud™ poker, it is the dealer's hand that must qualify. As the dealer's hand is partially concealed during play (usually only one card, at most) is displayed to the player before player wagering is complete), the player must always be aware that even ranked player hands can lose to a dealer's hand and no bonus will be paid out unless the side bet has been made, and then usually only to hands having a rank of a flush or higher.

Rules of Blackjack

Some versions of Blackjack are now described. Blackjack hands are scored according to the point total of the cards in the hand. The hand with the highest total wins as long as it is 21 or less. If the total is greater than 21, it is a called a "bust." Numbered cards 2 through 10 have a point value equal to their face value, and face cards (i.e., Jack, Queen and King) are worth 10 points. An Ace is worth 11 points unless it would bust a hand, in which case it is worth 1 point. Players play against the dealer and win by having a higher point total no greater than 21. If the player busts, the player loses, even if the dealer also busts. If the player and dealer have hands with the same point value, this is called a "push," and neither party wins the hand.

After the initial bets are placed, the dealer deals the cards, either from one or more, but typically two, hand-held decks of cards, or from a "shoe" containing multiple decks of cards, generally at least four decks of cards, and typically many more. A game in which the deck or decks of cards are hand-held is known as a "pitch" game. "Pitch" games are generally not played in casinos. When playing with more than one deck, the decks are shuffled together in order to make it more difficult to remember which cards have been dealt and which have not. The dealer deals two cards to each player and to himself. Typically, one of the dealer's two cards is dealt face-up so that all players can see it, and the other is face down. The face-down card is called the "hole card." In a European variation, the "hole card" is dealt after all the players' cards are dealt and their hands have been played. The players' cards are dealt face up from a shoe and face down if it is a "pitch" game.

A two-card hand with a point value of 21 (i.e., an Ace and a face card or a 10) is called a "Blackjack" or a "natural" and wins automatically. A player with a "natural" is conventionally paid 3:2 on his bet, although in 2003 some Las Vegas casinos began paying 6:5, typically in games with only a single deck.

Once the first two cards have been dealt to each player and the dealer, the dealer wins automatically if the dealer has a "natural" and the player does not. If the player has a "natural" and the dealer does not, the player automatically wins. If the dealer and player both have a "natural," neither party wins the hand.

If neither side has a "natural," each player completely plays out their hand; when all players have finished, the dealer plays his hand.

The playing of the hand typically involves a combination of four possible actions "hitting," "standing," "doubling down," or "splitting" his hand. Often another action called "surrendering" is added. To "hit" is to take another card. To "stand" is to take no more cards. To "double down" is to double the wager, take precisely one more card and then "stand." When a player has identical value cards, such as a pair of 8s, the player can "split" by placing an additional wager and playing each card as the first card in two new hands. To "surrender" is to forfeit half the player's bet and give up his hand. "Surrender" is not an option in most casino games of Blackjack. A player's turn ends if he "stands," "busts" or "doubles down." If the player "busts," he loses even if the dealer subsequently busts. This is the house advantage.

After all players have played their hands, the dealer then reveals the dealer's hole card and plays his hand. According to house rules (the prevalent casino rules), the dealer must hit until he has a point total of at least 17, regardless of what the players have. In most casinos, the dealer must also hit on a "soft" 17 (e.g., an Ace and 6). In a casino, the Blackjack table felt is marked to indicate if the dealer hits or stands on a soft 17. If the dealer busts, all remaining players win. Bets are normally paid out at odds of 1:1.

Four of the common rule variations are one card split Aces, early surrender, late surrender and double-down restrictions. In the first variation, one card is dealt on each Ace and the player's turn is over. In the second, the player has the option to surrender before the dealer checks for Blackjack. In the third, the player has the option to surrender after the dealer checks for Blackjack. In the fourth, doubling-down is only permitted for certain card combinations.

Insurance

Insurance is a commonly-offered betting option in which the player can hedge his bet by wagering that the dealer will win the hand. If the dealer's "up card" is an Ace, the player is offered the option of buying Insurance before the dealer checks his "hole card." If the player wishes to take Insurance, the player can bet an amount up to half that of his original bet. The Insurance bet is placed separately on a special portion of the table, which is usually marked with the words "Insurance Pays 2:1." The player buying Insurance is betting that the dealer's "hole card" is one with a value of 10 (i.e., a 10, Jack, Queen or King). Because the dealer's up card is an Ace, the player who buys Insurance is betting that the dealer has a "natural."

If the player originally bets $10 and the dealer shows an Ace, the player can buy Insurance by betting up to $5. Suppose the player makes a $5 Insurance bet and the player's hand with the two cards dealt to him totals 19. If the dealer's hole card is revealed to be a 10 after the Insurance betting period is over (the dealer checks for a "natural" before the players play their hands), the player loses his original $10 bet, but he wins the $5 Insurance bet at odds of 2:1, winning $10 and therefore breaking even. In the same situation, if the dealer's hole card is not one with a value of ten, the player immediately loses his $5 Insurance bet. But if the player chooses to stand on 19, and if the dealer's hand has a total value less than 19, at the end of the dealer's turn, the player wins his original $10 bet, making a net profit of $5. In the same situation, if the dealer's hole card is not one with a value of ten, again the player will immediately lose their $5 Insurance bet, and if the dealer's hand has a total value greater than the player's at the end of both of their turns, for example the player stood on 19 and the dealer ended his turn with 20, the player loses both his original $10 bet and his $5 Insurance bet.

Basic Strategy

Blackjack players can increase their expected winnings by several means, one of which is "basic strategy." "Basic strategy" is simply something that exists as a matter of general practice; it has no official sanction. The "basic strategy" determines when to hit and when to stand, as well as when doubling down or splitting in the best course. Basic strategy is based on the player's point total and the dealer's visible card. Under some conditions (e.g., playing with a single deck according to downtown Las Vegas rules) the house advantage over a player using basic strategy can be as low as 0.16%. Casinos offering options like surrender and double-after-split may be giving the player using basic strategy a statistical advantage and instead rely on players making mistakes to provide a house advantage.

A number of optional rules can benefit a skilled player, for example: if doubling down is permitted on any two-card hand other than a natural; if "doubling down" is permitted after splitting; if early surrender (forfeiting half the bet against a face or Ace up card before the dealer checks for Blackjack) is permitted; if late surrender is permitted; if re-splitting Aces is permitted (splitting when the player has more than two cards in their hand, and has just been dealt a second ace in their hand); if drawing more than one card against a split Ace is permitted; if five or more cards with a total no more than 21 is an automatic win (referred to as "Charlies").

Other optional rules can be detrimental to a skilled player. For example: if a "natural" pays less than 3:2 (e.g., Las Vegas Strip single-deck Blackjack paying out at 6:5 for a "natural"); if a hand can only be split once (is re-splitting possible for other than aces); if doubling down is restricted to certain totals (e.g., 9 11 or 10 11); if Aces may not be re-split; if the rules are those of "no-peek" (or European) Blackjack, according to which the player loses hands that have been split or "doubled down" to a dealer who has a "natural" (because the dealer does not check for this automatically winning hand until the players had played their hands); if the player loses ties with the dealer, instead of pushing where neither the player or the dealer wins and the player retains their original bet.

Card Counting

Unlike some other casino games, in which one play has no influence on any subsequent play, a hand of Blackjack removes those cards from the deck. As cards are removed from the deck, the probability of each of the remaining cards being dealt is altered (and dealing the same cards becomes impossible). If the remaining cards have an elevated proportion of 10-value cards and Aces, the player is more likely to be dealt a natural, which is to the player's advantage (because the dealer wins even money when the dealer has a natural, while the player wins at odds of 3:2 when the player has a natural). If the remaining cards have an elevated proportion of low-value cards, such as 4s, 5s and 6s, the player is more likely to bust, which is to the dealer's advantage (because if the player busts, the dealer wins even if the dealer later busts).

The house advantage in Blackjack is relatively small at the outset. By keeping track of which cards have been dealt, a player can take advantage of the changing proportions of the remaining cards by betting higher amounts when there is an elevated proportion of 10-value cards and Aces and by better lower amounts when there is an elevated proportion of low-value cards. Over time, the deck will be unfavorable to the player more often than it is favorable, but by adjusting the amounts that he bets, the player can overcome that inherent disadvantage. The player can also use this information to refine basic strategy. For instance, basic strategy calls for hitting on a 16 when the dealer's up card is a 10, but if the player knows that the deck has a disproportionately small number of low-value cards remaining, the odds may be altered in favor of standing on the 16.

There are a number of card-counting schemes, all dependent for their efficacy on the player's ability to remember either a simplified or detailed tally of the cards that have been played. The more detailed the tally, the more accurate it is, but the harder it is to remember. Although card counting is not illegal, casinos will eject or ban successful card counters if they are detected.

Shuffle tracking is a more obscure, and difficult, method of attempting to shift the odds in favor of the player. The player attempts to track groups of cards during the play of a multi-deck shoe, follow them through the shuffle, and then looks for the same group to reappear from the new shoe, playing and betting accordingly.

XIV. Casino Countermeasures

Some methods of thwarting card counters include using a large number of decks. Shoes containing 6 or 8 decks are common. The more cards there are, the less variation there is in the proportions of the remaining cards and the harder it is to count them. The player's advantage can also be reduced by shuffling the cards more frequently, but this reduces the amount of time that can be devoting to actual play and therefore reduces the casino profits. Some casinos now use shuffling machines, some of which shuffle one set of cards while another is in play, while others continuously shuffle the cards. The distractions of the gaming floor environment and complimentary alcoholic beverages also act to thwart card counters. Some methods of thwarting card counters include using varied payoff structures, such Blackjack payoff of 6:5, which is more disadvantageous to the player than the standard 3:2 Blackjack payoff.

XV. Video Wagering Games

Video wagering games are set up to mimic a table game using adaptations of table games rules and cards.

In one version of video poker the player is allowed to inspect five cards randomly chosen by the computer. These cards are displayed on the video screen and the player chooses which cards, if any, that he or she wishes to hold. If the player wishes to hold all of the cards, i.e., stand, he or she presses a STAND button. If the player wishes to hold only some of the cards, he or she chooses the cards to be held by pressing HOLD keys located directly under each card displayed on the video screen. Pushing a DEAL button after choosing the HOLD cards automatically and simultaneously replaces the unchosen cards with additional cards which are randomly selected from the remainder of the deck. After the STAND button is pushed, or the cards are replaced, the final holding is evaluated by the game machine's computer and the player is awarded either play credits or a coin payout as determined from a payoff table. This payoff table is stored in the machine's computer memory and is also displayed on the machine's screen. Hands with higher poker values are awarded more credits or coins. Very rare poker hands are awarded payoffs of 800-to-1 or higher.

XVI. Apparatus for Playing Over a Communications System

FIG. 1 shows apparatus for playing the game. There is a plurality of player units 40-1 to 40-n which are coupled via a communication system 41, such as the Internet, with a game playing system comprising an administration unit 42, a player register 43, and a game unit 45. Each unit 40 is typically a personal computer with a display unit and control means (a keyboard and a mouse).

When a player logs on to the game playing system, their unit 40 identifies itself to the administration unit. The system holds the details of the players in the register 43, which contains separate player register units 44-1 to 44-n for all the potential players, i.e., for all the members of the system.

Once the player has been identified, the player is assigned to a game unit 45. The game unit contains a set of player data units 46-1 to 46-6, a dealer unit 47, a control unit 48, and a random dealing unit 49.

Up to seven players can be assigned to the game unit 45. There can be several such units, as indicated, so that several games can be played at the same time if there are more than seven members of the system logged on at the same time. The assignment of a player unit 40 to a player data unit 46 may be arbitrary or random, depending on which player data units 46 and game units 45 are free. Each player data unit 46 is loaded from the corresponding player register unit 44 and also contains essentially the same details as the corresponding player unit 40, and is in communication with the player unit 40 to keep the contents of the player unit and player data unit updated with each other. In addition, the appropriate parts of the contents of the other player data units 46 and the dealer unit 47 are passed to the player unit 40 for display.

The logic unit 48 of the game unit 45 steps the game unit through the various stages of the play, initiating the dealer actions and awaiting the appropriate responses from the player units 40. The random dealing unit 49 deals cards essentially randomly to the dealer unit 47 and the player data units 46. At the end of the hand, the logic unit passes the results of the hand, i.e., the wins and/or losses, to the player data units 46 to inform the players of their results. The administrative unit 42 also takes those results and updates the player register units 44 accordingly.

The player units 40 are arranged to show a display. To identify the player, the player's position is highlighted. As play proceeds, so the player selects the various boxes, enters bets in them, and so on, and the results of those actions are displayed. As the cards are dealt, a series of overlapping card symbols is shown in the Bonus box. At the option of the player, the cards can be shown in a line below the box, and similarly for the card dealt to the dealer. At the end of the hand, a message is displayed informing the player of the results of their bets, i.e., the amounts won or lost.

XVII. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

XVIII. References

The following patents and patent applications are hereby incorporated by reference herein for all purposes: U.S. Pat. Nos. 6,579,181, 6,299,536, 6,093,103, 5,941,769, 7,114,718, U.S. patent application Ser. No. 10/622,321, U.S. Pat. Nos. 4,515,367, 5,000,453, 7,137,630, and 7,137,629.

What is claimed is:

1. A method comprising:
controlling, by at least one processor:
receiving, over a communication network, first location determination signals from a first mobile computing device of a first user;
determining, based on continuous monitoring of the first location determination signals, whether an amount of time spent by the first user within a predetermined geographic region is more than a predetermined threshold amount of time, wherein the predetermined geographic region is remote from the at least one processor;
determining that the first user belongs to a first group, when the amount of time spent by the first user within the predetermined geographic region is determined to be more than the predetermined threshold amount of time;
determining a second group to which a second user belongs;
determining that the first group is a rival to the second group;
matching the first user and the second user in a fantasy sports game based on the first group being the rival to the second group;
determining an expected number of points for each real life player of a plurality of real life players;
rendering, over the communication network, on an interface of the first mobile computing device, first team selection information excluding real life players for selection for a first fantasy sports team of the first group, such that a number of common real life players selectable for the first fantasy sports team and a second fantasy sports team selectable for the second group does not exceed a threshold, in which the first team selection information indicates at least one first real life player selectable for the first fantasy sports team for the fantasy sports game from a first set of real life players from the plurality of real life players that is specific to the first group, wherein the interface of the first mobile computing device displays the expected number of points for each one of the at least one first real life player;
rendering, over the communication network, on an interface of a second mobile computing device of the second user, second team selection information excluding real life players for selection for the second fantasy sports team that are selected for the first fantasy sports team, in which the second team selection information indicates at least one second real life player selectable for the second fantasy sports team for the fantasy sports game from a second set of real life players from the plurality of real life players that is specific to the second group, wherein the interface of the second mobile computing device displays the expected number of points for each one of the at least one second real life player;
receiving, over the communication network, data signals indicating performances of each of the at least one first real life player and the at least one second real life player in at least one real life sporting event;
when an indication is received that an offer from one user of the first user and the second user to the other user of the first user and the second user for a portion of a prize pool is accepted by the other user, terminating the fantasy sports game; and
when the indication is not received, determining a winner of the fantasy sports game from the first user and the second user based at least in part on the performances of each of the at least one first real life player and the at least one second real life player in the at least one real life sporting event indicated in the data signals.

2. The method of claim 1, further comprising:
controlling, by the at least one processor, determining the second group based on at least one of: the second user being a fan of a second team, the second user being a student at a second school, the second user being an alumni of a second school, the second user being a patron of a second merchant, or the second user being a second gender.

3. The method of claim 1, in which the first user is assigned to the first group without a request from the first user to be assigned to the first group.

4. The method of claim 1, further comprising:
controlling, by the at least one processor, forming the first group, in which the first group is defined to include given users that are proximate to a first location.

5. The method of claim 4, in which forming the first group includes forming the first group in response to a request to form the first group from a sponsor of the first group.

6. The method of claim 1, further comprising:
controlling, by the at least one processor, determining outcomes of a plurality of other fantasy sports games that are each between respective users of the first group and respective users of the second group.

7. The method of claim 6, further comprising:
controlling, by the at least one processor, determining an outcome of a group game based on the outcomes of the fantasy sports game and the plurality of other fantasy sports games.

8. The method of claim 7, further comprising:
controlling, by the at least one processor, determining that the first group wins the group game based on a total number of games from the fantasy sports game and the plurality of other fantasy sports games won by users of the first group exceeding a total number of games from the fantasy sports game and the other fantasy sports games won by users of the second group.

9. The method of claim 7, further comprising:
controlling, by the at least one processor, determining that the first group wins the group game based on a total number of points earned by users of the first group through play of the fantasy sports game and the plurality of other fantasy sports games exceeding to a total number of points earned by users of the second group though play of the fantasy sports game and the plurality of other fantasy sports games.

10. The method of claim 7, further comprising:
controlling, by the at least one processor, assigning a prize to a group that wins the group game.

11. The method of claim 10, in which assigning the prize includes making a payment to respective accounts of users in the group that wins the group game.

12. The method of claim 10, in which assigning the prize includes making a payment to an account of a sponsor of the group that wins the group game.

13. The method of claim 12, in which the sponsor is not a user of the group that wins the group game.

14. The method of claim 13, in which the sponsor includes a charity chosen by users of the group that wins the group game.

15. The method of claim 1, in which the fantasy sports game is based on a real life tournament, in which real life sports players in the real life tournament are dropped from the real life tournament as the real life tournament progresses and are not replaced in the fantasy sports game so that some real life players on each of the first fantasy sports team and the second fantasy sports team do not earn points after the some real life players are eliminated from the real life tournament.

16. The method of claim 1, further comprising:
controlling, by the at least one processor, during play of the fantasy sports game, facilitating the first user offering a buyout of the fantasy sports game to the second user.

17. The method of claim 16, further comprising:
controlling, by the at least one processor,
receiving, from the first mobile computing device over the communication network, an indication from the first user of an amount of money that the second user will be awarded if the second user accepts the buyout; and
presenting, over the communication network, at the second mobile computing device, the amount to the second user in an offer to end the fantasy sports game.

18. The method of claim 17, further comprising:
controlling, by the at least one processor,
receiving, from the second mobile computing device over the communication network, an acceptance of the offer; and
in response to receiving the acceptance, awarding the amount of money to the second user and awarding a second amount of money to the first user, in which the second amount of money includes an amount of money in a prize pool for the fantasy sports game minus the amount of money.

19. The method of claim 1, further comprising:
controlling, by the at least one processor,
presenting, over the communication network, at the first mobile computing device, the first user with an option to offer a doubling raise of the fantasy sports game to the second user prior to a start of the fantasy sports game.

20. An apparatus comprising:
at least one processor configured to control:
receiving, over a communication network, first location determination signals from a first mobile computing device of a first user;
determining, based on continuous monitoring of the first location determination signals, whether an amount of time spent by the first user within a predetermined geographic region is more than a predetermined threshold amount of time, wherein the predetermined geographic region is remote from the at least one processor;
determining a first group to which the first user belongs, when the amount of time spent by the first user within the predetermined geographic region is determined to be more than the predetermined threshold amount of time;
determining a second group to which a second user belongs;
determining that the first group is a rival to the second group;
matching the first user and the second user in a fantasy sports game based on the first group being the rival to the second group;
determining an expected number of points for each real life player of a plurality of real life players;
rendering, over the communication network, on an interface of the first mobile computing device, first team selection information excluding real life players for selection for a first fantasy sports team of the first group, such that a number of common real life players selectable for the first fantasy sports team and a second fantasy sports team to be selected for the second group does not exceed a threshold, in which the first team selection information indicates at least one first real life player selectable for the first fantasy sports team for the fantasy sports game from a first set of real life players from the plurality of real life players that is specific to the first group, wherein the interface of the first mobile computing device displays the expected number of points for each one of the at least one first real life player;
rendering, over the communication network, on an interface of a second mobile computing device of the second user, second team selection information excluding real life players for selection for the second fantasy sports team that are selected for the first fantasy sports team, in which the second team selection information indicates at least one second real life player selectable for the second fantasy sports team for the fantasy sports game from a second set of real life players from the plurality of real life players that is specific to the second group, wherein the interface of the second mobile computing device displays the expected number of points for each one of the at least one first real life player;
when an indication is received that an offer from one user of the first user and the second user to the other user of the first user and the second user for a portion of a prize pool is accepted by the other user, terminating the fantasy sports game; and when the indication is not received, determining a winner of the fantasy sports game from the first user and the second user based at least in part on performances of each of the at least one first real life player and the at least one second real life player in at least one real life sporting event.

* * * * *